(12) United States Patent
Ren et al.

(10) Patent No.: US 11,429,805 B2
(45) Date of Patent: Aug. 30, 2022

(54) SYSTEM AND METHOD FOR DEEP MACHINE LEARNING FOR COMPUTER VISION APPLICATIONS

(71) Applicant: Samsung Electronics Co., Ltd., Suwon-si (KR)

(72) Inventors: Haoyu Ren, San Diego, CA (US); Mostafa El-Khamy, San Diego, CA (US); Jungwon Lee, San Diego, CA (US); Aman Raj, La Jolla, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 290 days.

(21) Appl. No.: 16/872,199

(22) Filed: May 11, 2020

(65) Prior Publication Data

US 2021/0124985 A1  Apr. 29, 2021

Related U.S. Application Data

(60) Provisional application No. 62/966,975, filed on Jan. 28, 2020, provisional application No. 62/927,625, filed on Oct. 29, 2019.

(51) Int. Cl.
*G06K 9/62* (2022.01)
*G06N 20/00* (2019.01)
(Continued)

(52) U.S. Cl.
CPC .......... *G06K 9/6217* (2013.01); *G06N 7/005* (2013.01); *G06N 20/00* (2019.01); *G06T 7/11* (2017.01);
(Continued)

(58) Field of Classification Search
CPC ......... G06K 9/6217; G06T 7/11; G06T 7/593; G06T 2200/08; G06T 2207/10028;
(Continued)

(56) References Cited

U.S. PATENT DOCUMENTS

2003/0140020 A1  7/2003  Chen et al.
2003/0147558 A1  8/2003  Loui et al.
(Continued)

OTHER PUBLICATIONS

Dougherty, "Weakly-Supervised Temporal Activity Localization and Classification with Web Videos", University of California Riverside, Sep. 2019. (Year: 2019).*
(Continued)

*Primary Examiner* — Kenny A Cese
(74) *Attorney, Agent, or Firm* — Lewis Roca Rothgerber Christie LLP

(57) ABSTRACT

A computer vision (CV) training system, includes: a supervised learning system to estimate a supervision output from one or more input images according to a target CV application, and to determine a supervised loss according to the supervision output and a ground-truth of the supervision output; an unsupervised learning system to determine an unsupervised loss according to the supervision output and the one or more input images; a weakly supervised learning system to determine a weakly supervised loss according to the supervision output and a weak label corresponding to the one or more input images; and a joint optimizer to concurrently optimize the supervised loss, the unsupervised loss, and the weakly supervised loss.

20 Claims, 10 Drawing Sheets

(51) Int. Cl.
  G06N 7/00     (2006.01)
  G06T 7/593    (2017.01)
  G06T 7/11     (2017.01)
  G06T 15/00    (2011.01)
(52) U.S. Cl.
  CPC .............. *G06T 7/593* (2017.01); *G06T 15/00* (2013.01); *G06T 2200/08* (2013.01); *G06T 2207/10028* (2013.01); *G06T 2207/20081* (2013.01); *G06T 2207/20132* (2013.01)
(58) Field of Classification Search
  CPC ........... G06T 2207/20081; G06T 2207/20132; G06N 20/00; G06N 7/005; G06N 15/00
  See application file for complete search history.

(56) References Cited

U.S. PATENT DOCUMENTS

| | | | |
|---|---|---|---|
| 2009/0171871 | A1 | 7/2009 | Zhang et al. |
| 2013/0325773 | A1 | 12/2013 | Sinyavskiy et al. |
| 2014/0140610 | A1 | 5/2014 | Tu et al. |
| 2015/0055855 | A1 | 2/2015 | Rodriguez et al. |
| 2016/0350655 | A1 | 12/2016 | Weiss et al. |
| 2020/0082224 | A1* | 3/2020 | Sikka ................ G06N 3/084 |

OTHER PUBLICATIONS

Caballero, Jose, et al., "Real-Time Video Super-Resolution with Spatio-Temporal Networks and Motion Compensation," Proceedings of the IEEE Conference on Computer Vision and Pattern Recognition, 2017, 10 pages.

Chang, Jia-Ren, et al., "Pyramid Stereo Matching Network," Proceedings of the IEEE Conference on Computer Vision and Pattern Recognition, 2018, 9 pages.

Eigen, David, et al., "Depth Map Prediction from a Single Image using a Multi-Scale Deep Network," Advances in Neural Information Processing Systems, 2014, 9 pages.

Hoff, William, et al., "Surfacesfrom Stereo: Integrating Feature Matching, Disparity Estimation, and Contour Detection," IEEE Transactions on Pattern Analysis and Machine Intelligence, vol. 11, No. 2, Feb. 1989, 16 pages.

Li, Zhengqi, et al., "MegaDepth: Learning Single-View Depth Prediction from Internet Photos," Proceedings of the IEEE Conference on Computer Vision and Pattern Recognition, 2018, 10 pages.

Liu, Miaomiao, et al., "Discrete-Continuous Depth Estimation from a Single Image," Proceedings of the IEEE Conference on Computer Vision and Pattern Recognition, 2014, 8 pages.

Melekhov, Iaroslav, et al., "Relative camera pose Estimation Using Convolutional Neural Networks," International Conference on Advanced Concepts for Intelligent Vision Systems. Springer, Cham, 2017, 12 pages.

Quan, Long, et al., "Linear N-Point Camera Pose Determination," IEEE Transactions on Pattern Analysis and Machine Intelligence, vol. 21, No. 7, Jul. 1999, 7 pages.

Ren, Haoyu, et al., "Deep Robust Single Image Depth Estimation Neural Network Using Scene Understanding," IEEE Conference on Computer Vision and Patten Recognition Workshops, 2019, 9 pages.

Ren, Haoyu, et al., "CT-SRCNN: Cascade Trained and Trimmed Deep Convolutional Neural Networks for Image Super Resolution," 2018 IEEE Winter Conference on Applications of Computer Vision (WACV), IEEE, 2018, 9 pages.

Sanchez, Javier, et al., "TV-L1 Optical Flow Estimation," Image Processing On Line, 2013, 14 pages.

Sun, Deqing, et al. "PWC-Net: CNNs for Optical Flow Using Pyramid, Warping, and Cost Volume," Proceedings of the IEEE Conference on Computer Vision and Pattern Recognition, 2018, 10 pages.

Timofte, Radu, et al., "A+: Adjusted Anchored Neighborhood Regression for Fast Super-Resolution," Asian Conference on Computer Vision. Springer, Cham, 2014, 15 pages.

Zhou, Tinghui, et al. Unsupervised Learning of Depth and Ego-Motion from Video, Proceedings of the IEEE Conference on Computer Vision and Pattern Recognition, 2017, 10 pages.

* cited by examiner

| | Monocular depth estimation | Stereo matching | Image/video enhancement (use super resolution as example) | Multi-view depth estimation |
|---|---|---|---|---|
| Multi-frame input $I_a I_b I_c$ | Consecutive frames from single camera $I_{t-1} I_t I_{t+1}$ | Images from dual camera $I_l/I_r$ | Consecutive LR frames from single camera $I^{LR}_{t-1} I^{LR}_t I^{LR}_{t+1}$ | Images from different cameras $I_a/I_b$ |
| Estimated supervision item | Depth $D_t$ | Disparity $D$ | High resolution frames $I^{HR}_{t-1} I^{HR}_t I^{HR}_{t+1}$ | Depth $D_a$ $D_b$ |
| Supervised learning module (S) | Encoder-decoder based SIDE | Disparity estimation network | SISR network | Encoder-decoder based SIDE |
| Supervised loss $L_s$ (used in S) | L1 with ground-truth depth | L1 with ground-truth disparity | Reconstruction loss between $I^{HR}_t$ and ground-truth HR image | L1 with ground-truth depth |
| Unsupervised learning module (U) | Ego-motion compensation + 2D vs. 3D projection | Left-right warping based on estimated disparity | Optical flow estimation + 2D HR image warping | Perspective projection + camera calibration |
| Unsupervised loss $L_u$ (used in U) | Photometric loss between warped images and true images of frame $t-1/t+1$ | Photometric loss between warped left image and true right image | Photometric loss between warped estimated HR images | L2 between the world coordinates of aligned points |

| | Depth relationship between pixel/region pairs | Disparity relationship between pixel/region pairs | Intensity relationship between pixel/region pairs | Depth relationship between pixel/region pairs |
|---|---|---|---|---|
| Weakly supervised label $\hat{O}^*$ | | | | |
| Weakly supervised learning module (W) | Evaluate the consistency between weakly labeled depth $\hat{D}^*$ and estimated depth $D_t$ | Evaluate the consistency between weakly labeled disparity $\hat{D}^*$ and estimated disparity $D_t$ | Evaluate the consistency between weakly labeled pixel/region intensities (or RR/G/B values) and estimated HR image $I_t^{HR}$ | Evaluate the consistency between weakly labeled depth $\hat{D}^*$ and estimated depth $D_t$ |
| Weakly supervised loss $L_W$ used in W | Ordinal loss | Ordinal loss | Ordinal loss | Ordinal loss |

From FIG. 7A

FIG. 7B

SYSTEM AND METHOD FOR DEEP MACHINE LEARNING FOR COMPUTER VISION APPLICATIONS

CROSS-REFERENCE TO RELATED APPLICATION(S)

This application claims priority to and the benefit of U.S. Provisional Application No. 62/927,625, filed on Oct. 29, 2019, entitled "SYSTEM AND METHOD FOR PROVIDING A DEEP LEARNING FRAMEWORK BASED ON MULTIPLE LEARNING TECHNIQUES FOR COMPUTER VISION APPLICATION," and also claims priority to and the benefit of U.S. Provisional Application No. 62/966,975, filed on Jan. 28, 2020, entitled "DEEP LEARNING FRAMEWORK BASED ON MULTIPLE LEARNING STRATEGIES FOR CV APPLICATIONS WITH MULTI-FRAME INPUT," the entire content of all of which is incorporated herein by reference.

FIELD

One or more example embodiments of the present disclosure relate to a computer vision system, and a method to train the computer vision system using machine learning.

BACKGROUND

Computer vision applications, for example, such as depth estimation and image/video enhancement, have wide uses in real scenarios. For example, depth estimation may be utilized in foreground/background segmentation for image Bokeh, and image/video enhancement has become a standard feature in many image signal processors (ISP) for most modern cellphone cameras today.

Recently, the field of computer vision has been shifting from statistical methods to deep learning neural network methods. For example, deep learning neural network methods may enable a single model to learn meaning from images to perform a specific computer vision task, obviating the need for a pipeline of specialized, hand-crafted methods. Generally, deep learning neural network methods may utilize a single machine learning technique and corresponding loss function to train for a specific computer vision application, which may limit their accuracy.

The above information disclosed in this Background section is for enhancement of understanding of the background of the present disclosure, and therefore, it may contain information that does not constitute prior art.

SUMMARY

One or more example embodiments of the present disclosure are directed to a computer vision system having a multiple machine learning strategy framework to train for various computer vision applications, and a method for training the computer vision system.

According to one or more example embodiments of the present disclosure, a computer vision (CV) training system, includes: a supervised learning system configured to estimate a supervision output from one or more input images according to a target CV application, and determine a supervised loss according to the supervision output and a ground-truth of the supervision output; an unsupervised learning system configured to determine an unsupervised loss according to the supervision output and the one or more input images; a weakly supervised learning system configured to determine a weakly supervised loss according to the supervision output and a weak label corresponding to the one or more input images; and a joint optimizer configured to optimize the supervised loss, the unsupervised loss, and the weakly supervised loss.

In an example embodiment, the target CV application may correspond to monocular depth estimation, and the supervision output may correspond to a depth estimated from a target image from among the one or more input images.

In an example embodiment, the unsupervised learning system may be configured to convert 2-dimensional (2D) image coordinates corresponding to the one or more input images into 3-dimensional (3D) coordinates according to the estimated depth, and calculate the unsupervised loss based on at least the 3D coordinates.

In an example embodiment, the target CV application may correspond to stereo matching, and the supervision output may correspond to a disparity estimated between a left image and a right image from among the one or more input images.

In an example embodiment, the unsupervised learning system may be configured to shift one of the left image and the right image according to the estimated disparity to generate a warped image, and calculate the unsupervised loss based on at least the warped image.

In an example embodiment, the target CV application may correspond to image/video enhancement, and the supervision output may correspond to high-resolution images estimated from low-resolution input images from among the one or more input images.

In an example embodiment, the unsupervised learning system may be configured to estimate an optical flow corresponding to the estimated high-resolution images, and calculate the unsupervised loss based on at least the estimated optical flow and the estimated high-resolution images.

In an example embodiment, the target CV application may correspond to multi-view depth estimation, and the supervision output may correspond to a depth estimated in each of multiple input frames from among the one or more input images.

In an example embodiment, the unsupervised learning system may be configured to generate a 3D point cloud for each of the multiple input frames according to the estimated depth in each of the multiple input frames, and calculate the unsupervised loss based on at least distances between aligned coordinates of the 3D point clouds.

In an example embodiment, the joint optimizer may be configured to concurrently optimize the supervised loss, the unsupervised loss, and the weakly supervised loss according to a joint loss function including corresponding weights for the supervised loss, the unsupervised loss, and the weakly supervised loss.

In an example embodiment, the system may further include a weak label generator to generate the weak label as a patch-based weak label having a patch-pair corresponding to different cropped regions of the one or more input images, the patch-based weak label defining a relationship corresponding to the supervision output between the cropped regions of the patch-pair.

According to one or more example embodiments of the present disclosure, a method for training a computer vision (CV) system, includes: estimating a supervision output from one or more input images according to a target CV application; determining a supervised loss according to the supervision output and a ground-truth of the supervision output;

determining an unsupervised loss according to the supervision output and the one or more input images; determining a weakly supervised loss according to the supervision output and a weak label corresponding to the one or more input images; and optimizing the supervised loss, the unsupervised loss, and the weakly supervised loss.

In an example embodiment, the target CV application may correspond to monocular depth estimation, and the supervision output may correspond to a depth estimated from a target image from among the one or more input images.

In an example embodiment, the method may further include: converting 2-dimensional (2D) image coordinates corresponding to the one or more input images into 3-dimensional (3D) coordinates according to the estimated depth; and calculating the unsupervised loss based on at least the 3D coordinates.

In an example embodiment, the target CV application may correspond to stereo matching, and the supervision output may correspond to a disparity estimated between a left image and a right image from among the one or more input images.

In an example embodiment, method may further include: shifting one of the left image and the right image according to the estimated disparity to generate a warped image; and calculating the unsupervised loss based on at least the warped image.

In an example embodiment, the target CV application may correspond to image/video enhancement, and the supervision output may correspond to high-resolution images estimated from low-resolution images from among the one or more input images.

In an example embodiment, the method may further include: estimating an optical flow corresponding to the estimated high-resolution images; and calculating the unsupervised loss based on at least the estimated optical flow and the estimated high-resolution images.

In an example embodiment, the target CV application may correspond to multi-view depth estimation, and the supervision output may correspond to a depth estimated in each of multiple input frames from among the one or more input images.

In an example embodiment, the method may further include: generating a 3D point cloud for each of the multiple input frames according to the estimated depth in each of the multiple input frames; and calculating the unsupervised loss based on at least distances between aligned coordinates of the 3D point clouds.

In an example embodiment, the optimizing may include: concurrently optimizing the supervised loss, the unsupervised loss, and the weakly supervised loss according to a joint loss function including corresponding weights for the supervised loss, the unsupervised loss, and the weakly supervised loss.

In an example embodiment, the method may further include: generating the weak label as a patch-based weak label having a patch-pair corresponding to different cropped regions of the one or more input images, the patch-based weak label defining a relationship corresponding to the supervision output between the cropped regions of the patch-pair.

BRIEF DESCRIPTION OF THE DRAWINGS

The above and other aspects and features of the present disclosure will become more apparent to those skilled in the art from the following detailed description of the example embodiments with reference to the accompanying drawings.

FIGS. 7A-7B is a table illustrating an overview of the multiple learning strategy framework of the computer vision training system applied to various computer vision applications, according to one or more example embodiments of the present disclosure.

DETAILED DESCRIPTION

Figure 1:
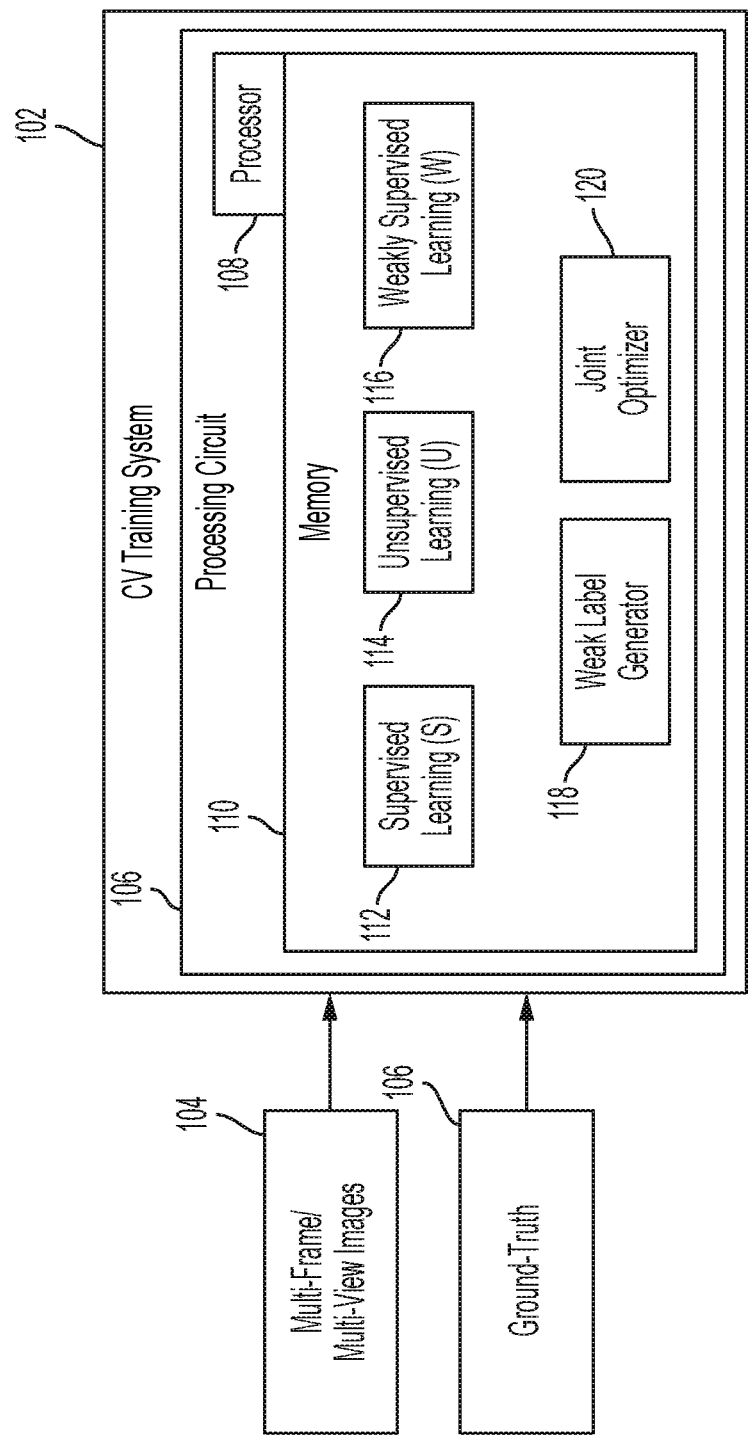
FIG. 1 is a block diagram of a computer vision training system, according to one or more example embodiments of the present disclosure.

Hereinafter, example embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated.

One or more example embodiments of the present disclosure are directed to a multiple learning strategy framework for a computer vision training system. The multiple learning strategy framework may combine up to three different machine learning techniques to improve accuracy of training for various different computer vision applications, but without additional computational costs for a prediction procedure. For example, in some embodiments, the multiple learning strategy framework may combine a supervised learning technique, an unsupervised learning technique, and a weakly supervised learning technique to train for various different computer vision applications and scenarios.

In some embodiments, a supervision output (e.g., a supervision target output or a supervision target item) may be generated (e.g., may be estimated) according to the supervised learning technique. The supervision output may be generated from one or more input images, and may correspond to information that is estimated from the one or more input images that may be desired by a corresponding CV application. For example, the supervision output may correspond to depth, disparity, high-resolution images, multi-view depth, and/or the like. In some embodiments, a supervised loss may be calculated between the supervision output and a ground-truth of the supervision output according to the supervised learning technique.

In some embodiments, the supervision output may be used as an input to calculate an unsupervised loss according to the unsupervised learning technique, and as an input to calculate a weakly supervised loss according to the weakly supervised learning technique. For example, the supervision output may be used to transform (e.g., to warp) an input image, which may be used to calculate the unsupervised loss according to the unsupervised learning technique, and the supervision output may be compared with weak labels to calculate the weakly supervised loss according to the weakly supervised learning technique. As a result, accuracy of the supervision output may be further refined (e.g., further improved) during optimization of the unsupervised loss and the weakly supervised loss.

In some embodiments, the weak labels used to calculate the weakly supervised loss may be pixel-based or patch-based, and may be generated from the input images or from the ground-truth. Accordingly, in some embodiments, flexibility may be improved over computer vision systems that may support only pixel-based weak labels.

In some embodiments, the multiple learning strategy framework may be applied to any suitable computer vision based application having multi-frame/multi-image inputs. The multi-frame/multi-image inputs may be generated from the same source (e.g., consecutive frames from a single camera) or from different sources (e.g., images with different perspectives or different field-of-views from a dual-camera or different cameras).

In some embodiments, the computer vision system may be trained end-to-end for a target computer vision application by optimizing a supervised loss function, an unsupervised loss function, and a weakly supervised loss function concurrently (e.g., jointly, simultaneously, or at the same time) with each other. In some embodiments, optimizing the supervised loss function, the unsupervised loss function, and the weakly supervised loss function concurrently with each other, may include a case where the optimization processes of the supervised loss function, the unsupervised loss function, and the weakly supervised loss function may temporally overlap with each other, at least in part.

FIG. 1 is a block diagram of a computer vision training system, according to one or more example embodiments of the present disclosure.

In brief overview, the computer vision (CV) training system 102 may include a deep learning neural network (DNN) framework to train for various different kinds of computer vision (CV) applications according to multiple machine learning techniques. For example, in some embodiments, the CV training system 102 may utilize a supervised learning technique (S), an unsupervised learning technique (U), and a weakly supervised learning technique (W) to be trained for various different CV application scenarios. Some non-limiting examples of the CV applications may include monocular depth estimation, stereo matching, image/video enhancement, multi-view depth estimation, and/or the like.

In some embodiments, the CV training system 102 may generate (e.g., may estimate) a supervision output corresponding to a target CV application, and may generate (e.g., may minimize) a supervised loss function according to the supervised learning technique (S) between the supervision output and a corresponding ground-truth of the supervision output. The supervision output may correspond to information that is obtained (e.g., estimated, calculated, extracted, converted, and/or the like) from one or more input images that may be desired by (e.g., that may be a target of) the target CV application, for example, such as depth, disparity, corresponding high-resolution images, multi-view depth, and/or the like. In other words, the supervision output obtained from the one or more input images may be a target of the corresponding CV application that is used to process, analyze, classify, transform, warp, and/or the like the one or more input images according to the corresponding target CV application.

In some embodiments, the supervision output may be used as an input to generate an unsupervised loss function according to the unsupervised learning technique (U), as well as an input to generate a weakly supervised loss function according to the weakly supervised learning technique (W). For example, in some embodiments, the CV training system 102 may transform or warp one or more of the input images based on the supervision output to generate the unsupervised loss function according to the unsupervised learning technique (U), and may generate the weakly supervised loss function to compare weak labels corresponding to the one or more input images with the supervision output according to the weakly supervised learning technique (W). As a result, accuracy of the supervision output may be further improved, for example, during optimization of the unsupervised loss function and weakly supervised loss function.

In more detail, referring to FIG. 1, in some embodiments, the CV training system 102 may receive multi-frame/multi-view images 104 and a ground-truth (e.g., ground-truth values, ground-truth images, and/or the like) 106. For example, the multi-frame/multi-view images 104 may be captured from one or more imaging devices (e.g., one or more cameras). In this case, the multi-frame/multi-view images 104 may be from the same imaging device (e.g., from the same camera), or may be from different imaging devices (e.g., from a dual-camera, two or more different cameras, and/or the like). For example, in some embodiments, the multi-frame/multi-view images 104 may include multiple consecutive frames captured from the same camera (e.g., from a single camera), or may include multiple views (e.g., stereoscopic views, different field-of-views, or the like) captured from two or more cameras (e.g., a dual-camera, two or more different cameras, and/or the like).

In some embodiments, the ground-truth 106 may include one or more values or images corresponding to a target value or image of a supervision output. For example, in some embodiments, the CV training system 102 may generate (e.g., may estimate) the supervision output according to (e.g., desired by) a target CV application, and may compare the supervision output with a corresponding ground-truth 106 of the supervision output. For example, in some embodiments, the CV training system 102 may generate (e.g., may minimize or may reduce) a supervised loss function according to the supervision output and the corresponding ground-truth.

In some embodiments, the CV training system 102 may include one or more processing circuits 106 including one or more processors 108 and memory 110. Each of the processors 108 may be a general purpose processor or specific purpose processor, an application specific integrated circuit (ASIC), one or more field programmable gate arrays (FPGAs), a group of processing components, or other suitable processing components. Each of the processors 108 may be integrated within a single device or distributed across multiple separate systems, servers, or devices (e.g., computers). For example, each of the processors 108 may be an internal processor with respect to the CV training system 102, or one or more of the processors 108 may be an external processor, for example, implemented as part of one or more servers or as a cloud-based computing system. Each of the processors 108 may be configured to execute computer code or instructions stored in the memory 110, and/or received from other computer readable media (e.g., CDROM, network storage, a remote server, and/or the like).

The memory 110 may include one or more devices (e.g., memory units, memory devices, storage devices, and/or the like) for storing data and/or computer code for performing and/or facilitating the various processes described in the present disclosure. The memory 110 may include random access memory (RAM), read-only memory (ROM), hard drive storage, temporary storage, non-volatile memory, flash memory, optical memory, or any other suitable memory for storing software objects and/or computer instructions. The memory 110 may include database components, object code components, script components, and/or any other kinds of information structures for supporting the various activities and information structures described in the present disclosure. The memory 110 may be communicably connected to the one or more processors 108 via the one or more processing circuits 106, and may include computer code for executing (e.g., by the one or more processors 108) one or more processes described herein.

In some embodiments, the memory 110 may include a supervised learning (S) module (e.g., a supervised learning system, a supervised learning neural network, a supervised learning framework, and/or the like) 112, an unsupervised learning (U) module (e.g., an unsupervised learning system, an unsupervised learning neural network, an unsupervised learning framework, and/or the like) 114, a weakly supervised learning (W) module (e.g., a weakly supervised learning system, a weakly supervised learning neural network, a weakly supervised learning framework, and/or the like) 116, a weak label generator 118, and a joint optimizer 120.

In various embodiments, the supervised learning module 112, the unsupervised learning module 114, the weakly supervised learning module 116, the weak label generator 118, and the joint optimizer 120 may be implemented within a single device (e.g., a single computer, a single server, a single housing, and/or the like), or at least some thereof may be distributed across multiple devices (e.g., across multiple computers, multiple servers, multiple housings, and/or the like). In various embodiments, each of the supervised learning module 112, the unsupervised learning module 114, the weakly supervised learning module 116, the weak label generator 118, and the joint optimizer 120 may include any suitable processor (e.g., one or more of the processors 108), memory (e.g., one or more memory devices of the memory 110), encoder-decoder pairs, logic devices, neural networks (e.g., convoluted neural networks (CNN), recursive neural networks (RNN), and/or the like), controllers, circuits (e.g., integrated circuits (IC)), and/or the like to support the various functions, processes, activities, and/or the like described in the present disclosure.

In some embodiments, the supervised learning module 112 may be trained to generate a predictive model (e.g., a supervision output) corresponding to a target CV application using training examples (e.g., using the ground-truth). For example, the training examples may include a label indicating its ground-truth. In some embodiments, the unsupervised learning module 114 may be trained without the benefit of the ground-truth. According to one or more example embodiments, the unsupervised learning module 114 may analyze, extract, organize, transform, warp, and/or the like one or more input images according to the supervision output generated by the supervised learning module 112. In some embodiments, the weakly supervised learning module 116 may be trained with both labeled data, and unlabeled data. For example, in some embodiments, the weakly supervised learning module 116 may be trained according to weak labels and the supervision output.

For example, as will be described in more detail below with reference to FIG. 2, in some embodiments, the supervised learning module 112 may generate (e.g., may estimate) a supervision output based on the multi-frame/multi-view images 104 according to a target CV application. The supervised learning module 112 may generate (e.g., may minimize) a supervised loss function between the supervision output and a corresponding ground-truth 106. The unsupervised learning module 114 may generate (e.g., may minimize) an unsupervised loss function according to the multi-frame/multi-view images 104 and the supervision output. For example, in some embodiments, the unsupervised learning module 114 may transform or may warp the multi-frame/multi-view images 104 according to the supervision output, and the transformed or warped images may be used to generate (e.g., to minimize) the unsupervised loss function.

The weakly supervised learning module 116 may generate (e.g., may minimize) a weakly supervised loss function according to the supervision output. For example, in some embodiments, the weakly supervised learning module 116 may generate (e.g., may minimize) the weakly supervised loss function between weak labels corresponding to the multi-frame/multi-view images 104, which may be generated by the weak label generator 118, and the supervision output. The weak label generator 118 may generate the weak labels (e.g., pixel-based or patch-based) from the multi-frame/multi-view images 104, or from the ground-truth 106 corresponding to the supervision output.

In some embodiments, the joint optimizer 120 may generate (e.g., may minimize) a joint loss function according to the supervised loss function, the unsupervised loss function, and the weakly supervised loss function to train the CV training system 102 according to the target CV application. In some embodiments, corresponding weights may be used in the joint loss function to balance the importance of each of the supervised loss function, the unsupervised loss function, and the weakly supervised loss function in the joint loss function.

Figure 2:
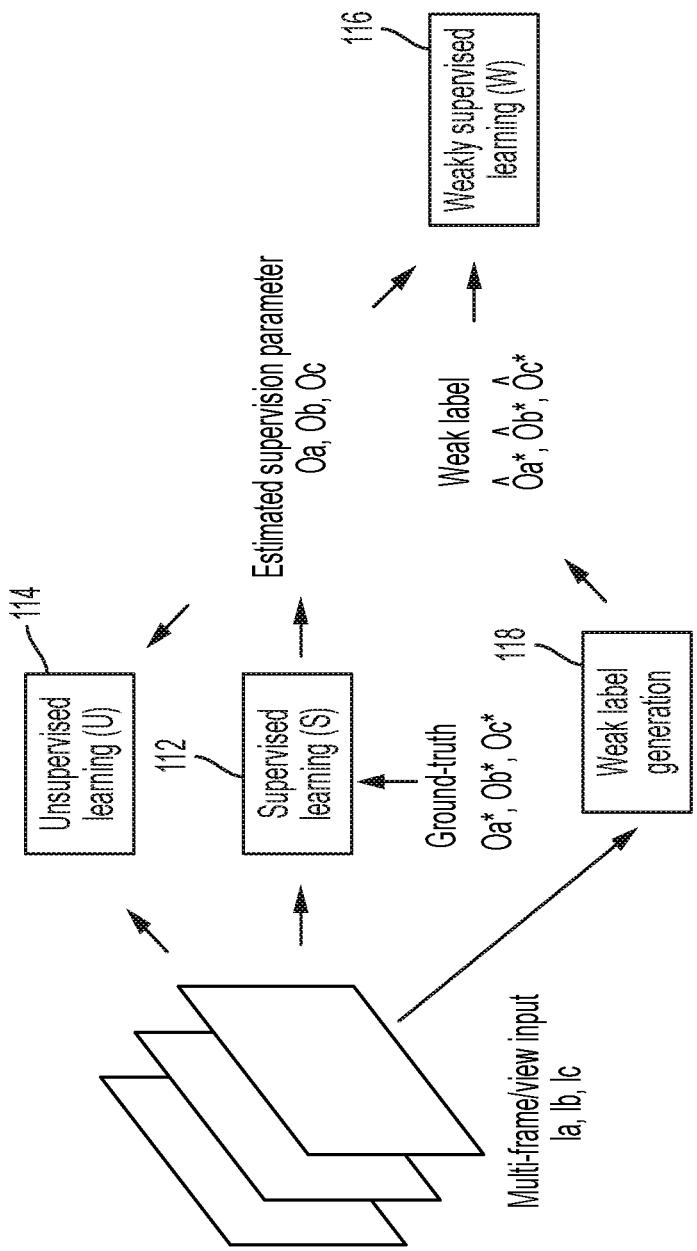
FIG. 2 is an illustration of a multiple learning strategy framework of the computer vision training system, according to one or more example embodiments of the present disclosure.

FIG. 2 is an illustration of a multiple learning strategy framework of the computer vision training system, according to one or more example embodiments of the present disclosure.

Referring to FIG. 2, in some embodiments, for an input of multi-frame/multi-view images (e.g., $I_a, I_b, I_c$), which may be generated by a single source (e.g., a single camera) or multiple sources (e.g., a dual-camera or multiple cameras), the supervised learning module 112 may generate (e.g., may estimate) a supervision output (e.g., $O_a, O_b, O_c$) according to a target CV application (e.g., by $O=S(I)$). In this case, a network (S) may be optimized by minimizing or reducing a supervised loss ($L_S$) function between the supervision output (e.g., $O_a$, $O_b$, $O_c$) and a corresponding ground-truth value (e.g., $O^*_a$, $O^*_b$, $O^*_c$). For example, in some embodiments, the supervised learning module 112 may minimize or reduce the supervised loss function $L_S(O_a, O^*_a)$, $L_S(O_b, O^*b)$, $L_S(O_c, O^*_c)$.

For a non-limiting example, when the CV application corresponds to monocular depth estimation, the supervised learning module 112 may estimate a depth (e.g., $D_t$) of an object in the multi-frame/multi-view images (e.g., $I_a,I_b,I_c$) as the supervision output (e.g., $O_a$, $O_b$, $O_c$). In another non-limiting example, when the CV application corresponds to stereo matching, the supervised learning module 112 may estimate a disparity (e.g., D) between a left image (e.g., $I_l$) and a right image (e.g., $I_r$) of the multi-frame/multi-view images (e.g., $I_a,I_b,I_c$) as the supervision output (e.g., $O_a$, $O_b$, $O_c$). In yet another non-limiting example, when the CV application corresponds to image/video enhancement, the supervised learning module 112 may estimate high-resolution frames (e.g., $I_{t-1}^{HR}, I_t^{HR}, I_{t+1}^{HR}$) corresponding to low-resolution input frames (e.g., $I_{t-1}^{LR}, I_t^{LR}, I_{t+1}^{LR}$) of the multi-frame/multi-view images (e.g., $I_a,I_b,I_c$) as the supervision output (e.g., $O_a$, $O_b$, $O_c$). In still another non-limiting example, when the CV application corresponds to multi-view depth estimation, the supervised learning module 112 may estimate a multi-view depth (e.g., $D_a,D_b$) of each of the multiple views in the multi-frame/multi-view images (e.g., $I_a,I_b,I_c$) as the supervision output (e.g., $O_a$, $O_b$, $O_c$).

In some embodiments, the unsupervised learning module 114 may receive the multi-frame/multi-view images (e.g., $I_a,I_b,I_c$) and the supervision output (e.g., $O_a$, $O_b$, $O_c$) as inputs, and may minimize or reduce an unsupervised loss ($L_a$) function. For example, in some embodiments, the unsupervised learning module 114 may minimize or reduce the unsupervised loss function $L_U(I_a, I_b, I_c, O_a, O_b, O_c)$. In some embodiments, the weakly supervised learning module 116 may receive the estimated supervision output (e.g., $O_a$, $O_b$, $O_c$), and may minimize or reduce a weakly supervised loss ($L_w$) function between a weak label (e.g., $\widehat{O_a}^*$, $\widehat{O_b}^*$, $\widehat{O_c}^*$) and the supervision output (e.g., $O_a$, $O_b$, $O_c$). For example, in some embodiments, the weakly supervised learning module 116 may minimize or reduce the weakly supervised loss function $L_w(O_a,\widehat{O_a}^*)$, $L_w(O_b,\widehat{O_b}^*)$, $L_w(O_c,\widehat{O_c}^*)$. In some embodiments, during training, the weakly supervised loss function $L_w(O_a,\widehat{O_a}^*)$, $L_w(O_b,\widehat{O_b}^*)$, $L_w(O_c,\widehat{O_c}^*)$ may be optimized.

In some embodiments, the weak label generator 118 may generate the weak label (e.g., $\widehat{O_a}^*,\widehat{O_b}^*,\widehat{O_c}^*$) from either the multi-frame/multi-view images (e.g., $I_a,I_b,I_c$), or from the ground-truth (e.g., $O^*_a$, $O^*_b$, $O^*_c$) directly. For example, in some embodiments, the weak label generator 118 may generate the weak label (e.g., $\widehat{O_a}^*,\widehat{O_b}^*,\widehat{O_c}^*$) according to an auxiliary task (e.g., via semantic segmentation). In this case, the weak label (e.g., $\widehat{O_a}^*,\widehat{O_b}^*,\widehat{O_c}^*$) may be generated according to heuristic rules associated with the auxiliary task. As a non-limiting example, a weak label depth may be generated from a semantic segmentation map with some prior knowledge, for example, such as the sky is always farther than trees.

In some embodiments, the weak label (e.g., $\widehat{O_a}^*,\widehat{O_b}^*,\widehat{O_c}^*$) generated by the weak label generator 118 may be pixel-based or patch-based. Pixel-based weak labels define relationships between individual pixels of an image, whereas patch-based weak labels define relationships between different cropped regions of the image, where each region includes a plurality of pixels. Accordingly, patch-based weak labels may be more flexible than pixel-based ordinal weak labels. For example, in the case of patch-based weak labels, in some embodiments, the weak label generator 118 may generate the patch-based weak label as a patch-pair (p,q) and a factor (e.g, a binary relationship, a distribution, a statistic, and/or the like). During training, the weakly supervised learning module 116 may check whether a patch-pair (p,q) of the supervision output (e.g., $O_a,O_b,O_c$) is consistent with (e.g., similar to) the generated weak label ($\widehat{O_a}^*,\widehat{O_b}^*,\widehat{O_c}^*$). For a non-limiting example, in the case where the CV application is for image/video enhancement, if p is from the sky and q is from a tree, then p should be more 'blue' than q in super resolution.

In some embodiments, the CV training system 102 may be trained end-to-end, for example, by optimizing the supervised loss ($L_S$) function, the unsupervised loss ($L_U$) function, and the weakly supervised loss ($L_w$) function concurrently. For example, in some embodiments, the joint optimizer 120 (e.g., see FIG. 1) may generate a joint loss function ($L_{all}$) according to the supervised loss ($L_S$) function, the unsupervised loss ($L_U$) function, the weakly supervised loss ($L_w$) function, and corresponding weights ($w_s,w_u,w_w$). The weights ($w_s,w_u,w_w$) may be used to balance each of the supervised loss ($L_S$) function, the unsupervised loss ($L_U$) function, and the weakly supervised loss ($L_w$) function in the joint loss function ($L_{all}$) for a target CV application. In some embodiments, the weights ($w_s,w_u,w_w$) may be determined (e.g., may be set) according to an ablation study for the target CV application. For example, in some embodiments, the joint optimizer 120 may generate (e.g., may minimize or reduce) the joint loss function ($L_{all}$) to train the CV training system 102 for a corresponding CV application according to the joint loss function ($L_{all}$) shown in equation 1.

$$L_{all}=w_s L_s+w_u L_u+w_w L_w \qquad \text{Equation 1:}$$

In equation 1, $L_s$ may correspond to a supervised loss function, $w_s$ may correspond to a weight applied to the supervised loss function ($L_s$), $L_u$ may correspond to an unsupervised loss function, $w_u$ may correspond to a weight applied to the unsupervised loss function ($L_u$), $L_w$ may correspond to a weakly supervised loss function, and $w_w$ may correspond to a weight applied to the weakly supervised loss function ($L_w$).

While FIG. 2 illustrates that the multi-frame/multi-view images ($I_a,I_b,I_c$) include three input frames or views, the present disclosure is not limited thereto. For example, the multiple learning strategy framework of the CV training system 102 may be applied to train for any suitable CV application with any suitable number of frames or views. Further, while FIG. 2 shows that the CV training system 102 includes the supervised learning module 112, the unsupervised learning module 114, and the weakly supervised learning module 116, the present disclosure is not limited thereto, and the CV training system 102 may use (e.g., may include) any suitable combinations from among the supervised learning module 112, the unsupervised learning module 114, and the weakly supervised learning module 116. For example, if the ground-truth of the supervision item is not available, the CV training system 102 may use the unsupervised learning module 114 and the weakly supervised learning module 116. As another example, if the multi-frame/multi-view images 104 include only a single-frame/single-image input, the CV training system 102 may use the supervised learning module 112 and weakly supervised learning module 116.

In some embodiments, the multi-frame/multi-view images ($I_a,I_b,I_c$) may be used to train the CV training system 102 (e.g., during training and/or development), but the multi-frame/multi-view images ($I_a,I_b,I_c$) may not be needed (e.g., may not be used or may not be required) by an end-user device for a prediction procedure of a target CV application in order to utilize the training of the CV training system 102 for the target CV application. For example, the prediction procedure of the target CV application of the end-user device may be based on a single-frame image input, and prediction time may not be increased or substantially increased. Accordingly, in addition to video-based CV applications, the CV training system 102 may be used for image-based CV applications having a single-frame image input.

Figure 3:
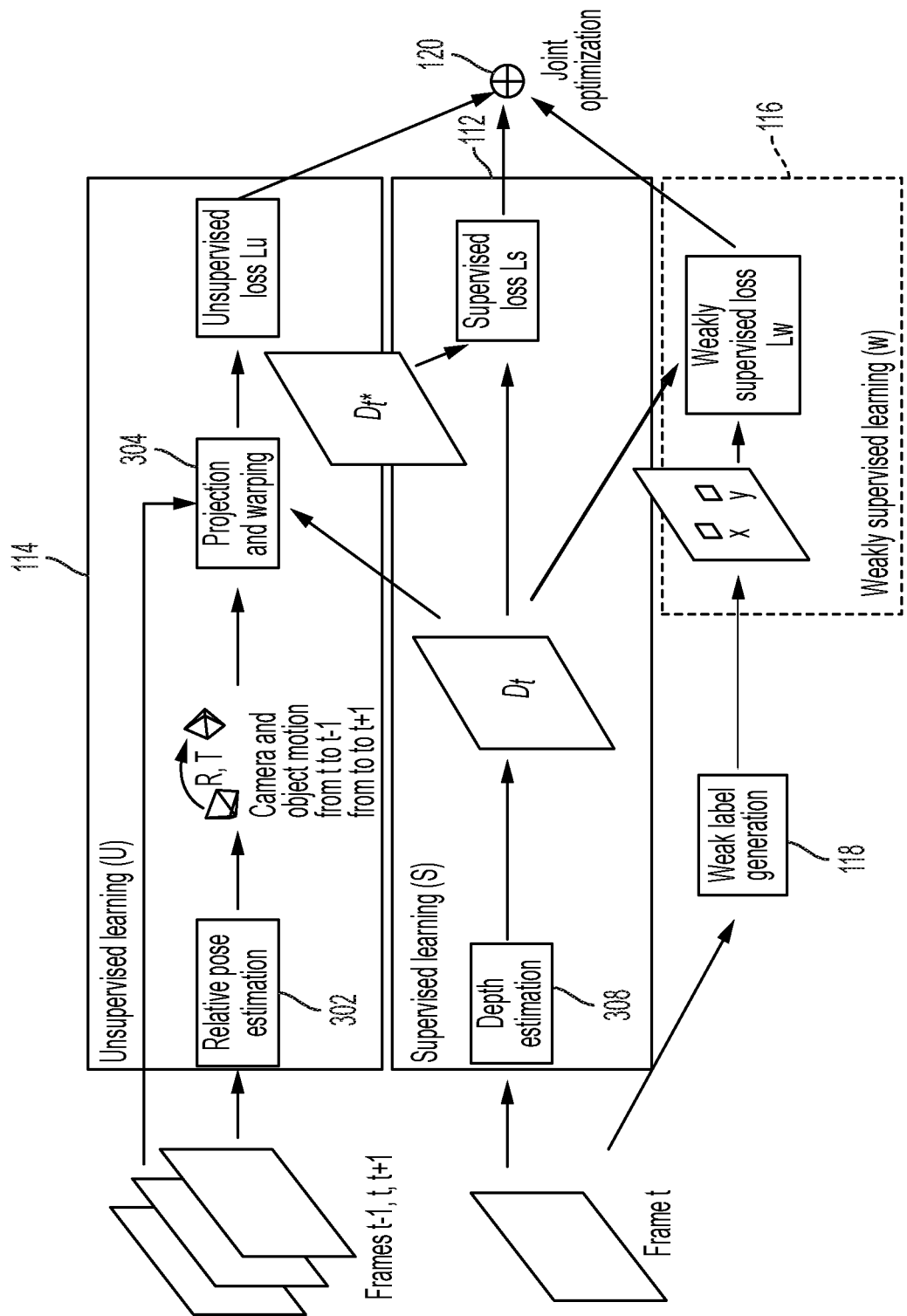
FIG. 3 is an illustration of the multiple learning strategy framework of the computer vision training system for monocular depth estimation, according to one or more example embodiments of the present disclosure.

FIG. 3 is an illustration of the multiple learning strategy framework of the computer vision training system for monocular depth estimation, according to one or more example embodiments of the present disclosure.

In one or more example embodiments of the present disclosure, the multiple learning strategy framework of the CV training system 102 may be applied to monocular depth estimation. Generally, monocular depth estimation is a CV application that may be used to estimate a pixelwise depth map for an image.

In brief overview, given multiple consecutive input frames, the supervised learning module may estimate a depth of an object shown in the input frames as the supervision output, and may calculate a supervised loss between the estimated depth and a ground-truth of the depth. The unsupervised learning module 114 may use the estimated depth to compensate for a rigid-motion of the object in the input frames in a 3D space, and may calculate an unsupervised photometric loss between the input frames according to the rigid motion and 3D coordinates of the 3D space. The weakly supervised learning module 114 may calculate a weakly supervised loss between the estimated depth and a weakly labeled depth, which may be generated from the input frames or from the ground-truth. In some embodiments, the CV training system 102 may be trained by optimizing the supervised loss, the unsupervised photometric loss, and the weakly supervised loss concurrently.

In more detail, referring to FIG. 3, in some embodiments, the CV training system 102 may receive multiple consecutive input image frames ($I_{t-1},I_t,I_{t+1}$), which may be generated by a single source (e.g., a single camera). For example, the input image frames ($I_{t-1},I_t,I_{t+1}$) may include a previous frame (t−1), a target frame (t), and a next frame (t+1), which may be adjacent to one another.

In some embodiments, the supervised learning module 112 may estimate a depth ($D_t$) of an object in the target frame (t) as the supervision output. For example, in some embodiments, the supervised learning module 112 may include a depth estimator (e.g., a depth estimation network) 308 to estimate the depth ($D_t$) using any suitable depth estimation method or algorithm as would be known to those skilled in the art, for example, such as conditional random field, encoder-decoder network, and/or the like. For example, in some embodiments, the depth estimator 308 may include one or more encoder-decoder pairs (e.g., a network of encoder-decoder pairs) to estimate the depth ($D_t$) of the object in the target frame (t).

In some embodiments, the supervised learning module 112 may calculate a supervised loss ($L_s$) between the estimated depth ($D_t$) and a ground-truth of the depth ($D^*_t$). For example, in some embodiments, the supervised learning module 112 may calculate the supervised loss ($L_s$) according to a supervised loss function shown in equation 2.

$$L_s=|D_t-D^*_t|$$ Equation 2:

In equation 2, $L_s$ may correspond to the supervised loss, $D_t$ may correspond to the estimated depth output by the depth estimator 308, and $D^*_t$ may correspond to the ground-truth of the estimated depth ($D_t$).

In some embodiments, the unsupervised learning module 114 may use the estimated depth ($D_t$) to compensate for a rigid-motion of the object in the input image frames ($I_{t-1}, I_t,I_{t+1}$) in a 3D space. For example, in some embodiments, the unsupervised learning module 114 may include a pose estimator (e.g., a pose estimation network) 302 and a projection and warping image transformer 304.

In some embodiments, the pose estimator 302 may determine a rigid-motion of the object from frame to frame of the input image frames ($I_{t-1},I_t,I_{t+1}$). For example, in some embodiments, the pose estimator 302 may determine a rigid-motion of the object from the target frame (t) to the previous frame (t−1), for example, as $M_{t \to t-1}$, as well as a rigid-motion of the object from the target frame (t) to the next frame (t+1), for example, as $M_{t \to t+1}$. Here, M may be a motion vector of the object, and each motion vector M may include a rotation (R) and a translation (T). The pose estimator 302 may determine the rigid-motion of the object using any suitable pose estimation method or algorithm as would be known to those skilled in the art, for example, such as linear n-point estimation, poseCNN or other suitable deep neural network, and/or the like, to output the motion vector M. For example, in some embodiments, the pose estimator 302 may include one or more encoder-decoder pairs (e.g., a network of encoder-decoder pairs) to output the motion vector M of the object according to the rigid motion of the object from frame to frame.

In some embodiments, the pose estimator 302 may have a similar (e.g., the same or substantially the same) encoder-decoder architecture as that of the depth estimator 308. In some embodiments, at least one of the encoder-decoder pairs of the pose estimator 302 may be shared with that of the depth estimator 308. Accordingly, computational costs may be reduced. However, the present disclosure is not limited thereto.

In some embodiments, the projection and warping image transformer 304 may compensate for the rigid-motion of the object in the 2D image of the input image frames ($I_{t-1}, I_t,I_{t+1}$), and may transform the compensated 2D image into a 3D space (e.g., 3D coordinates) according to the estimated depth ($D_t$). For example, in some embodiments, the projection and warping image transformer 304 may warp a 2D image of the input image frames ($I_{t-1}, I_t, I_{t+1}$) according to the motion vector M output from the pose estimator 302, to isolate the object in the 2D image from the rigid-motion in the input image frames ($I_{t-1},I_t,I_{t+1}$). In some embodiments, the projection and warping image transformer 304 may project (e.g., may convert) 2D coordinates of the object in the compensated 2D image to 3D coordinates according to the estimated depth ($D_t$). For example, the 2D coordinates may correspond to image coordinates (x, y) of the object in the compensated 2D image, and the estimated depth ($D_t$) may provide a depth dimension of the object corresponding to a third coordinate (z) of the 3D coordinates. Accordingly, in some embodiments, the projection and warping image transformer 304 may compensate for the rigid-motion of the object in the 3D space (e.g., the 3D coordinates) according to the estimated depth ($D_t$) generated by the supervised learning module 112.

In some embodiments, the unsupervised learning module 114 may calculate an unsupervised photometric loss ($L_u$) between the input image frames ($I_{t-1}, I_t, I_{t+1}$) according to the 3D coordinates and the rigid-motion compensation. For example, in some embodiments, the unsupervised learning module 114 may calculate the unsupervised photometric loss ($L_u$) according to an unsupervised loss function shown in equation 3.

$$L_u = \|I_{t-1} - K \cdot M_{t \to t-1} \circ (D_t K^{-1} \cdot I_t)\|^2 + \|I_{t+1} - K \cdot M_{t \to t+1} \circ (D_t K^{-1} \cdot I_t)\|^2 \quad \text{Equation 3:}$$

In equation 3, $L_u$ may correspond to the unsupervised loss, $I_{t-1}$ may correspond to a previous input image frame, $I_t$ may correspond to a target input image frame, $I_{t+1}$ may correspond to a next input image frame, K may correspond to an intrinsic matrix, $M_{t \to t-1}$ may correspond to a motion vector of the rigid-motion from the target input image frame ($I_t$) to the previous input image frame ($I_{t-1}$), $M_{t \to t+1}$ may correspond to a motion vector of the rigid-motion from the target input image frame ($I_t$) to the next input image frame ($I_{t+1}$), $D_t$ may correspond to the estimated depth output by the supervised learning module 112, · may correspond to the coordinate projection between 2D and 3D, and ° may correspond to the rigid motion compensation in the 3D space.

In some embodiments, the weakly supervised learning module 116 may calculate a weakly supervised loss ($L_w$) between a weakly labeled depth ($\widehat{D_t}$) corresponding to the target frame (t) and the estimated depth ($D_t$) generated by the supervised learning module 112 based on the target frame (t). For example, in some embodiments, the weak label generator 118 may generate the weakly labeled depth ($\widehat{D_t}$) from information derived from the input image frames ($I_{t-1}, I_t, I_{t+1}$) (or from the ground truth depth ($D^*_t$)), for example, such as a semantic segmentation map, a coarse depth estimation result, and/or the like. In various embodiments, the weakly labeled depth ($\widehat{D_t}$) may be pixel-based or patch-based. Accordingly, the weakly labeled depth ($\widehat{D_t}$) may include a pixel-pair (i, j) or a patch-pair (p, q), and may define a depth relationship (e.g., closer/farther) between the pixels of the pixel-pair (i, j) or between the regions of the patch-pair (p, q).

In some embodiments, when the weakly labeled depth ($\widehat{D_t}$) is generated to include the pixel-pair (i, j), the weakly supervised learning module 116 may calculate the weakly supervised loss ($L_w$) according to a weakly supervised loss function shown in equation 4.

$$L_w = \begin{cases} \log\left(1 + \sqrt{e^{P_{ij}}}\right) + \delta & \text{if } P_{ij} > 0.25 \\ \log(1 + e^{P_{ij}}) & \text{if } P_{ij} \le 0.25 \end{cases} \quad \text{Equation 4}$$

where, $$P_{ij} = -r_{ij}(\log D_{t,i} - \log D_{t,j})$$

In equation 4, $L_w$ may correspond to the weakly supervised loss, $D_{t,i}$ may correspond to the estimated depth of the pixel i in the frame t, $D_{t,j}$ may correspond to the estimated depth of the pixel j in the frame t, and 6 may correspond to a constant to avoid discontinuity. In this case, $r_{ij}=1$ if the pixel i is further than the pixel j, and $r_{ij}=-1$ otherwise (e.g., if the pixel j is further than the pixel i).

In some embodiments, when the weakly labeled depth ($\widehat{D_t}$) is generated to include the patch-pair (p, q), the weakly supervised learning module 116 may calculate the weakly supervised loss ($L_w$) according to a weakly supervised loss function shown in equation 5.

$$L_w = \begin{cases} \log\left(1 + \sqrt{e^{P_{ij}}}\right) + w(\text{var}(D_{t,p}) + \text{var}(D_{t,q})) & \text{if } P_{ij} > 0.25 \\ \log(1 + e^{P_{ij}}) + w(\text{var}(D_{t,p}) + \text{var}(D_{t,q})) & \text{if } P_{ij} \le 0.25 \end{cases} \quad \text{Equation 5}$$

where, $$P_{ij} = -r_{ij}(\log(\text{mean}(D_{t,p})) - \log(\text{mean}(D_{t,q})))$$

In equation 5, $L_w$ may correspond to the weakly supervised loss, $D_{t,p}$ may correspond to the estimated depth of the region p in the frame t, $D_{t,q}$ may correspond to the estimated depth of the region q in the frame t, and var may correspond to a variance to suppress outliers (e.g., when calculating $P_{ij}$). In this case, $r_{ij}=1$ if the region p is further than the region q, and $r_{ij}=1$ otherwise (e.g., if the region q is further than the region p).

In some embodiments, when the weakly labeled depth ($\widehat{D_t}$) is generated to include the patch-pair (p, q), a difference of a depth statistic from the region p and the region q in the estimated depth ($D_t$) may be evaluated. For example, if the region p and the region q are from the same semantic class, their depth distribution may be similar to each other. In this case, the weakly supervised learning module 116 may calculate the weakly supervised loss ($L_w$) according to Chi-square histogram distances between a histogram of the estimated depth of the region p ($D_{t,p}$) and a histogram of the estimated depth of the region q ($D_{t,q}$). For example, in some embodiments, the weakly supervised learning module 116 may calculate the weakly supervised loss ($L_w$) according to a weakly supervised loss function shown in equation 6.

$$L_w = \text{ChiSquare}(\text{hist}(D_{t,p}), (D_{t,q})) \quad \text{Equation 6:}$$

In equation 6, $L_w$ may correspond to the weakly supervised loss, ChiSquare may correspond to the chi-square distance between two histograms, hist may correspond to a histogram operation, $D_{t,p}$ may correspond to the estimated depth of the region p in the frame t, and $D_{t,q}$ may correspond to the estimated depth of the region q in the frame t.

In some embodiments, the CV training system 102 may be trained to improve monocular depth estimation by optimizing the supervised loss function (e.g., shown in equation 2), the unsupervised loss function (e.g., shown in equation 3), and the weakly supervised loss function (e.g., shown in equation 4, equation 5, or equation 6) concurrently. For example, in some embodiments, because the estimated depth ($D_t$) is used to calculate each of the supervised loss ($L_s$), the unsupervised loss ($L_u$), and the weakly supervised loss ($L_w$), the joint optimizer 120 may jointly optimize the supervised loss function, the unsupervised loss function, and the weakly supervised loss function according to the joint loss function ($L_{all}$), for example, as shown in equation 1.

Figure 4:
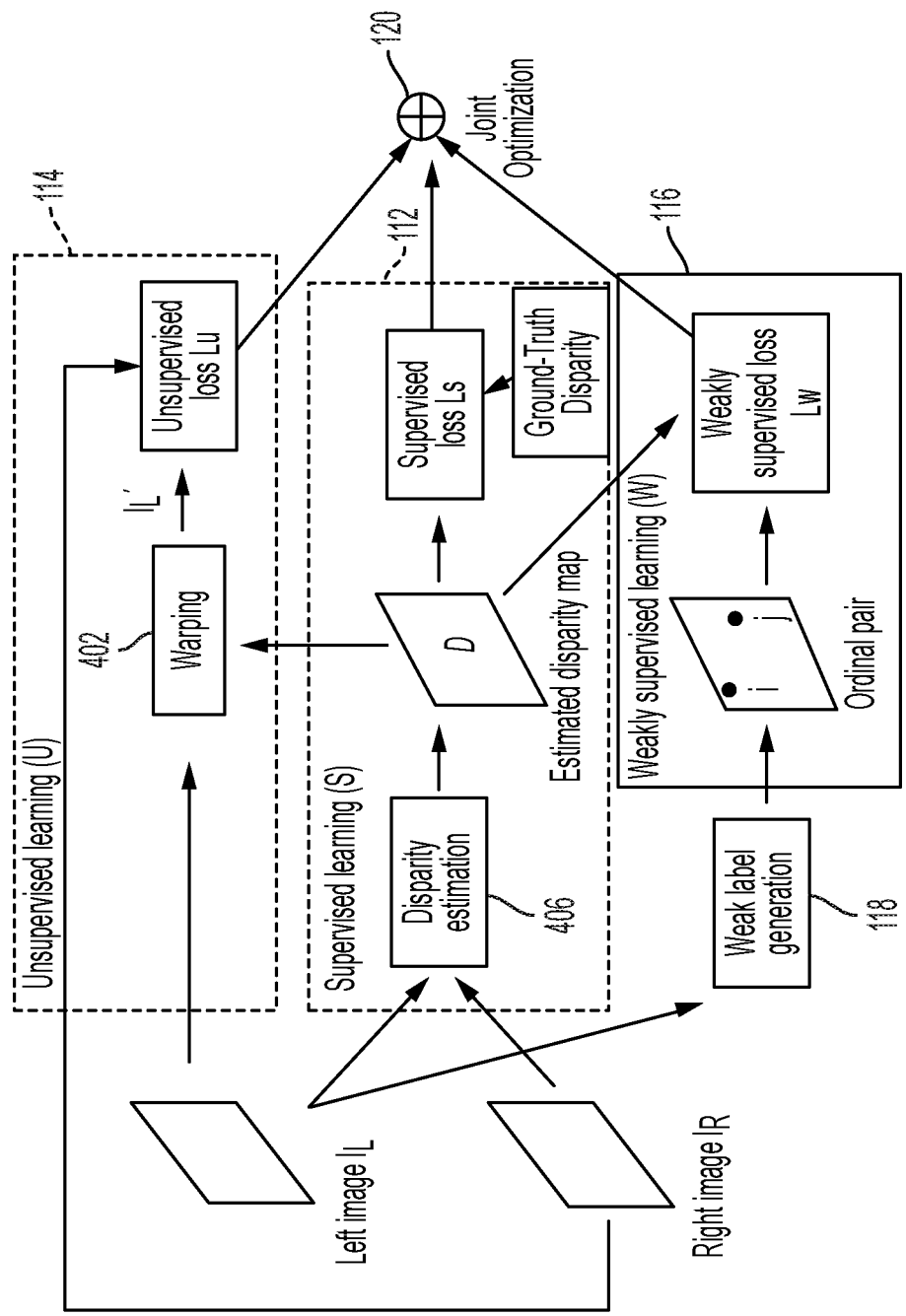
FIG. 4 is an illustration of the multiple learning strategy framework of the computer vision training system for stereo matching, according to one or more example embodiments of the present disclosure.

FIG. 4 is an illustration of the multiple learning strategy framework of the computer vision training system for stereo matching, according to one or more example embodiments of the present disclosure.

In one or more example embodiments of the present disclosure, the multiple learning strategy framework of the CV training system 102 may be applied to stereo matching (e.g., disparity estimation). Generally, stereo matching (e.g., disparity estimation) is a CV application that may be used to match pixels from images (e.g., a left image and a right image) having different perspectives (e.g., different stereoscopic views) of the same scene.

In brief overview, given multiple input images (e.g., a left image and a right image) corresponding to different stereoscopic views of the same scene, the supervised learning module may estimate a disparity between a first image (e.g., a left image) and a second image (e.g., a right image) as the supervision output, and may calculate a supervised loss between the estimated disparity and a ground-truth of the disparity. The unsupervised learning module 114 may use the estimated disparity to generate a warped image corresponding to one of the first image or the second image that is compensated according to the estimated disparity, and may calculate an unsupervised photometric loss between the warped image and a true image (e.g., an original image) of the other one of the first image or the second image (e.g., the image that was not used to generate the warped image). The weakly supervised learning module 114 may calculate a weakly supervised loss between the estimated disparity and a weakly labeled disparity, which may be generated from a corresponding one of the input images or from the ground-truth. In some embodiments, the CV training system 102 may be trained by optimizing the supervised loss, the unsupervised photometric loss, and the weakly supervised loss concurrently.

In more detail, referring to FIG. 4, in some embodiments, the CV training system 102 may receive multiple input images ($I_l,I_r$) corresponding to different perspectives (e.g., different stereoscopic views) of the same scene. For example, the multiple input images ($I_l,I_r$) may include a left image ($I_l$) and a right image ($I_r$), which may be generated by different sources (e.g., a dual-camera or different cameras), for example, such as a left camera and a right camera.

In some embodiments, the supervised learning module 112 may estimate a disparity (D) between the multiple input images ($I_l,I_r$). For example, the disparity may correspond to a difference between the left image ($I_l$) and the right image ($I_r$), which may be similar to rigid-motion but in one direction (e.g., a shift direction between the left image ($I_l$) and the right image ($I_r$)). In this case, in some embodiments, the supervised learning module 112 may include a disparity estimator (e.g., a disparity estimation network) 406 to estimate the disparity (D) between the left image ($I_l$) and the right image ($I_r$) using any suitable disparity estimation method or algorithm as would be known to those skilled in the art, for example, such as pixel-matching, PSMNet or other suitable deep neural networks, and/or the like. For example, in some embodiments, the disparity estimator 406 may include a neural network (e.g., a CNN, an RNN, and/or the like) that is trained to estimate the disparity (D) between the left image ($I_l$) and the right image ($I_r$).

In some embodiments, the supervised learning module 112 may calculate a supervised loss ($L_s$) between the estimated disparity (D) and a ground-truth of the disparity (D*). For example, in some embodiments, the supervised learning module 112 may calculate the supervised loss ($L_s$) according to a supervised loss function shown in equation 7.

$$L_s=|D-D^*| \quad \text{Equation 7:}$$

In equation 7, $L_s$ may correspond to the supervised loss, D may correspond to the estimated disparity output by the disparity estimator 406, and D* may correspond to the ground-truth of the estimated disparity (D).

In some embodiments, the unsupervised learning module 114 may use the estimated disparity (D) to generate a warped image (I'). In this case, the warped image (I') may be generated from any one of the input images ($I_l,I_r$). For example, in some embodiments, the unsupervised learning module 114 may include a warping image transformer 402.

In some embodiments, the warping image transformer 402 may generate the warped image (I') by warping any one of the left image ($I_l$) or the right image ($I_r$) according to the estimated disparity (D). For example, the warping image transformer 402 may shift one of the left image ($I_l$) or the right image ($I_r$) based on the estimated disparity (D) to generate the warped image (e.g., $I_l'$ or $I_r'$). In this case, because the disparity may correspond to a difference between the left image ($I_l$) and the right image ($I_r$), if the estimated disparity (D) was properly generated, the warped image (I') may be the same or substantially the same as the other image (e.g., the original image or the true image of the other one of the left image ($I_l$) or the right image ($I_r$)). For example, if the left image ($I_l$) is used to generate the warped image ($I_l'$) according to the estimated disparity (D), the warped image ($I_l'$) may be the same or substantially the same as the right image ($I_r$), if the estimated disparity (D) was properly generated. Similarly, if the right image ($I_r$) is used to generate the warped image ($I_r'$) according to the estimated disparity (D), the warped image ($I_r'$) may be the same or substantially the same as the left image ($I_l$), if the estimated disparity (D) was properly generated.

In some embodiments, the unsupervised learning module 114 may calculate an unsupervised photometric loss ($L_u$) according to the warped image (I') generated based on the estimated disparity (D), and the original image of the other one of the input images ($I_l,I_r$) (e.g., that was not used to generate the warped image (I')). For example, in some embodiments, the unsupervised learning module 114 may calculate the unsupervised photometric loss ($L_u$) according to an unsupervised loss function shown in equation 8.

$$L_u=\|I_r-I_l'\|^2=\|I_r-W(I_l,D)'\|^2 \quad \text{Equation 8:}$$

In equation 8, $L_u$ may correspond to the unsupervised loss, $I_l'$ may correspond to the warped image (e.g., corresponding to the left image ($I_l$) as shown in the example of FIG. 4), $I_l$ may correspond to the original image (or the true image) of the warped image (e.g., the left image ($I_l$) in the example shown in FIG. 4), $I_r$ may correspond to the original image (or the true image) of the other image (e.g., the right image ($I_r$) in the example shown in FIG. 4) from among the multiple input images ($I_l,I_r$), D may correspond to the estimated disparity output by the supervised learning module 112, and W may correspond to a warping operator.

In some embodiments, the weakly supervised learning module 116 may calculate a weakly supervised loss ($L_w$) between a weakly labeled disparity ($\hat{D}$) and the estimated disparity (D) generated by the supervised learning module 112. Because the disparity may be inversely proportional to depth, in some embodiments, the weakly labeled disparity ($\hat{D}$) may be generated by the weak label generator 118 in a similar manner as that of the weakly labeled depth ($\widehat{D_t}$). For example, in some embodiments, the weak label generator 118 may generate the weakly labeled disparity ($\hat{D}$) from information derived from the original image of the warped image (I') (or from the ground truth disparity (D*)), for example, such as a semantic segmentation map, and/or the like. In various embodiments, the weakly labeled disparity ($\hat{D}$) may be pixel-based or patch-based. Accordingly, the weakly labeled disparity ($\hat{D}$) may include a pixel-pair (i, j) or a patch-pair (p, q), and may define a disparity relationship (e.g., smaller/larger), which may be inversely proportional to depth (e.g., if patch p's depth is farther than patch q, patch p's depth is larger than patch q's and patch p's disparity is smaller than patch q's) between the pixels of the pixel-pair (i, j) or the regions of the patch-pair (p, q).

In some embodiments, the weakly supervised learning module 116 may calculate the weakly supervised loss ($L_w$) for stereo matching using the same or substantially the same weakly supervised loss function (e.g., equation 4, equation 5, or equation 6) as that used for monocular depth estimation discussed above with reference to FIG. 3, except that information corresponding to the estimated disparity (D) and the weakly labeled disparity ($\hat{D}$) may be used as inputs to calculate the weakly supervised loss ($L_w$) between the weakly labeled disparity ($\hat{D}$) and the estimated disparity (D). For example, as would be appreciated by those having ordinary skill in the art, the weakly supervised loss ($L_w$) may be calculated according to any suitable one of equation 4, equation 5, or equation 6 discussed above by using the estimated disparity information for each of the pixels (i, j) or regions (p, q) corresponding the weakly labeled disparity ($\hat{D}$), rather than using the depth relationship corresponding to the estimated depth ($D_t$) for each of the pixels (i, j) or regions (p, q) corresponding to the weakly labeled depth ($\widehat{D_t}$) as in the monocular depth estimation case discussed above with reference to FIG. 3. Accordingly, redundant description thereof may not be repeated.

In some embodiments, the CV training system 102 may be trained to improve stereo matching by optimizing the supervised loss function (e.g., shown in equation 7), the unsupervised loss function (e.g., shown in equation 8), and the weakly supervised loss function (e.g., shown in equation 4, equation 5, or equation 6 with the appropriate substitutions corresponding to the estimated disparity (D) and the weakly labeled disparity ($\hat{D}$)). For example, in some embodiments, because the estimated disparity (D) may be used to calculate each of the supervised loss ($L_s$), the unsupervised loss ($L_u$), and the weakly supervised loss ($L_w$), the joint optimizer 120 may jointly optimize the supervised loss function, the unsupervised loss function, and the weakly supervised loss function according to the joint loss function ($L_{all}$), for example, as shown in equation 1.

Figure 5A:
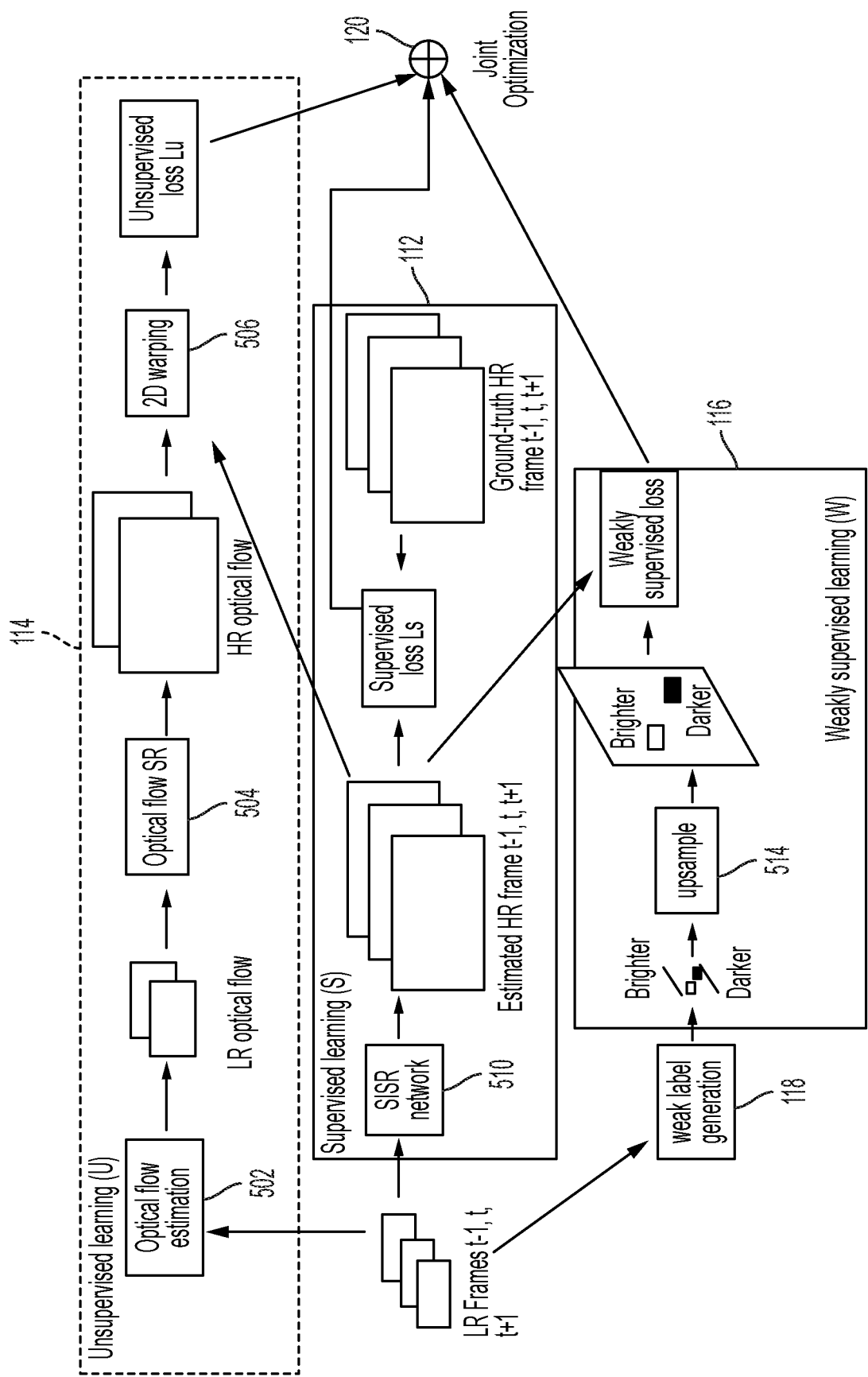
FIGS. 5A-5B are illustrations of the multiple learning strategy framework of the computer vision training system for image/video enhancement, according to one or more example embodiments of the present disclosure.
Figure 5B:
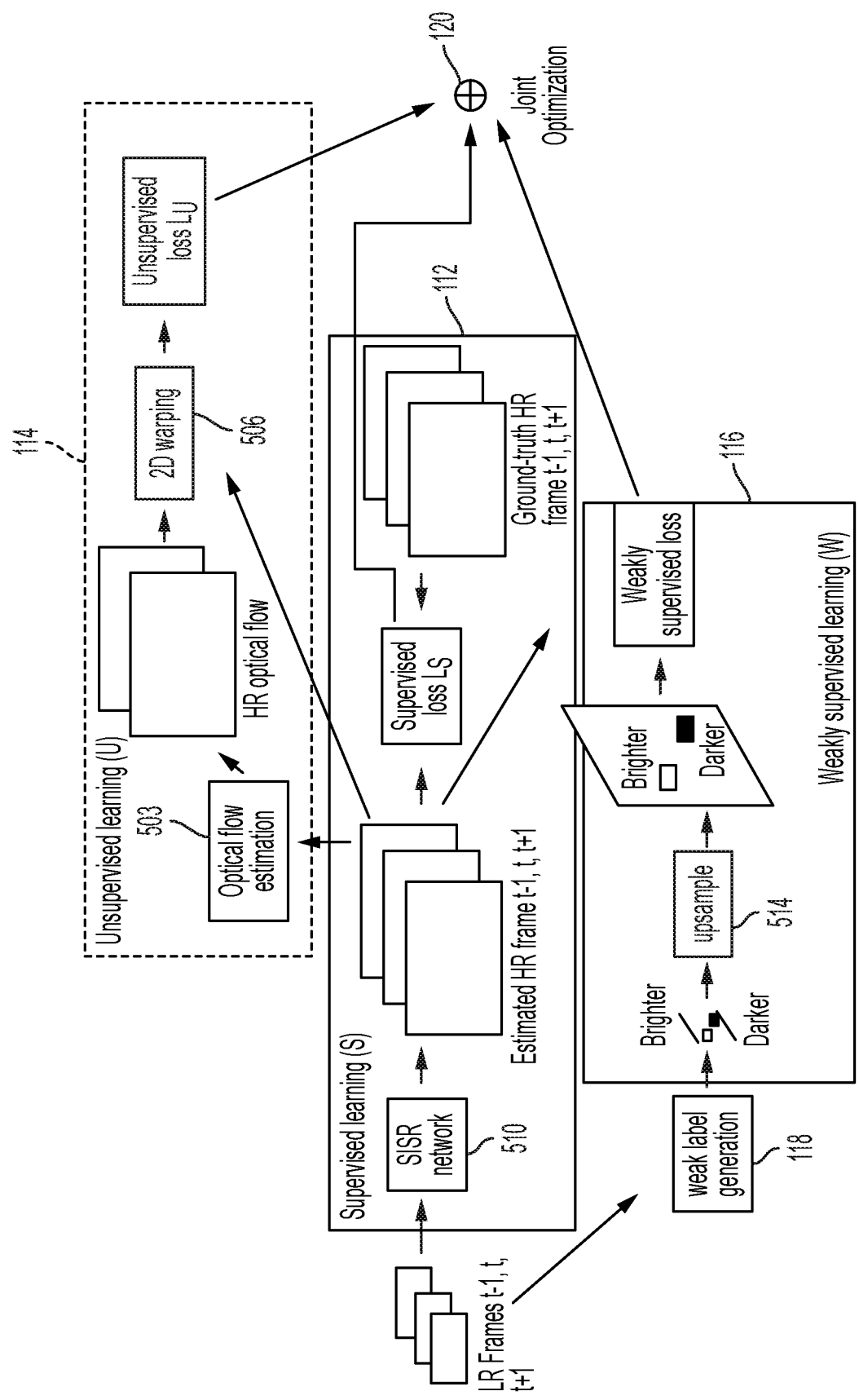

FIGS. 5A and 5B are illustrations of the multiple learning strategy framework of the computer vision training system for image/video enhancement, according to one or more example embodiments of the present disclosure.

In one or more example embodiments of the present disclosure, the multiple learning strategy framework of the CV training system 102 may be applied to image/video enhancement. Generally, image/video enhancement is a CV application that may be used to adjust (e.g., to enhance) a low resolution image to a high resolution image. Hereinafter, a non-limiting example of image/video enhancement in the context of a super-resolution (SR) network may be described with reference to FIGS. 5A and 5B, but the present disclosure is not limited thereto, and the same or substantially the same (e.g., a similar) architecture (e.g., multiple learning strategy framework) described with reference to FIGS. 5A and 5B may be utilized for other image/video enhancement CV applications with appropriate modifications, as would be appreciated by those having ordinary skill in the art.

In brief overview, given multiple consecutive low resolution (LR) input frames, the supervised learning module 112 may estimate corresponding high resolution (HR) images as the supervision output, and may calculate a supervised loss between the estimated HR images and a ground-truth of the HR images. The unsupervised learning module 114 may generate (e.g., may estimate) an optical flow corresponding to the estimated HR images, and may compensate for optical motion in the estimated HR images according to the optical flow. The unsupervised learning module 114 may calculate an unsupervised photometric loss between the warped estimated HR images. The weakly supervised learning module 114 may calculate a weakly supervised loss between the estimated HR images and weakly labeled HR images, which may be generated from the LR input frames or from the ground-truth. In some embodiments, the CV training system 102 may be trained by optimizing the supervised loss, the unsupervised photometric loss, and the weakly supervised loss concurrently.

In more detail, referring to FIGS. 5A and 5B, in some embodiments, the CV training system 102 may receive multiple consecutive LR input image frames ($I_{t-1}^{LR}, I_t^{LR}, I_{t+1}^{LR}$) which may be generated by a single source (e.g., a single camera). For example, the LR input image frames ($I_{t-1}^{LR}, I_t^{LR}, I_{t+1}^{LR}$) may include a first frame (t−1), a second frame (t), and a third frame (t+1), which may be adjacent to one another.

In some embodiments, the supervised learning module 112 may estimate HR images ($I_{t-1}^{HR}, I_t^{HR}, I_{t+1}^{HR}$) from the LR input frames ($I_{t-1}^{LR}, I_t^{LR}, I_{t+1}^{LR}$) as the supervision output. For example, in some embodiments, the supervised learning module 112 may include a single image super resolution (SISR) network 510 to estimate the HR images ($I_{t-1}^{HR}, I_t^{HR}, I_{t+1}^{HR}$) from the LR input frames ($I_{t-1}^{LR}, I_t^{LR}, I_{t+1}^{LR}$) using any suitable method or algorithm as would be known to those skilled in the art, for example, such as upsampling (e.g., bilinear/bicubic upsampling), sparse-code based dictionary learning, CT-SRCNN or other suitable neural networks, and/or the like. For example, in some embodiments, the SISR network 510 may include a neural network (e.g., a CNN, an RNN, and/or the like) trained to estimate the HR images ($I_{t-1}^{HR}, I_t^{HR}, I_{t+1}^{HR}$) from the LR input frames ($I_{t-1}^{LR}, I_t^{LR}, I_{t+1}^{LR}$).

In some embodiments, the supervised learning module 112 may calculate a supervised loss ($L_s$) between the estimated HR images ($I_{t-1}^{HR}, I_t^{HR}, I_{t+1}^{HR}$) and a ground-truth of the HR images ($I_{t-1}^{HR*}, I_t^{HR*}, I_{t+1}^{HR*}$). For example, in some embodiments, the supervised learning module 112 may calculate the supervised loss ($L_s$) between each corresponding frame-pair of the estimated HR images ($I_{t-1}^{HR}, I_t^{HR}, I_{t+1}^{HR}$) and the ground-truth HR images ($I_{t-1}^{HR*}, I_t^{HR*}, I_{t+1}^{HR*}$) according to a supervised loss function shown in equation 9.

$$L_s = \|I^{HR} - I^{HR*}\|^2 \qquad \text{Equation 9:}$$

In equation 9, $I^{HR}$ may correspond to any one of the estimated HR images ($I_{t-1}^{HR}, I_t^{HR}, I_{t+1}^{HR}$) in the corresponding frame-pair, and $I^{HR*}$ may correspond to the corresponding ground-truth HR image ($I_{t-1}^{HR*}, I_t^{HR*}, I_{t+1}^{HR*}$) in the corresponding frame-pair.

In some embodiments, the unsupervised learning module 114 may compensate for optical motion in the estimated HR images ($I_{t-1}^{HR}, I_t^{HR}, I_{t+1}^{HR}$). For example, in some embodiments, the unsupervised learning module 114 may generate (e.g., may estimate) an HR optical flow ($F_{t \to t-1}^{HR}, F_{t \to t+1}^{HR}$) to compensate for the optical motion in the estimated HR images ($I_{t-1}^{HR}, I_t^{HR}, I_{t+1}^{HR}$). Optical motion may be similar to rigid-motion, but may be global based rather than object base. Thus, while rigid-motion considers 3D motion (e.g., including a depth dimension), optical motion may consider motion in the 2D space (2D image coordinates) of the estimated HR images ($I_{t-1}^{HR}, I_t^{HR}, I_{t+1}^{HR}$).

In various embodiments, the unsupervised learning module 114 may generate (e.g., may estimate) the HR optical flow ($F_{t \to t-1}^{HR}, F_{t \to t+1}^{HR}$) from frame to frame of the LR input frames ($I_{t-1}^{LR}, I_t^{LR}, I_{t+1}^{LR}$), for example, as shown in FIG. 5A, or may generate (e.g., may estimate) the HR optical flow ($F_{t \to t-1}^{HR}, F_{t \to t+1}^{HR}$) from frame to frame of the estimated HR images ($I_{t-1}^{HR}, I_t^{HR}, I_{t+1}^{HR}$) directly, for example, as shown in FIG. 5B. Accordingly, in some embodiments, the unsupervised learning module 114 may include an optical flow estimator 502 and an optical flow SR generator 504 to generate the HR optical flow from the LR input frames ($I_{t-1}^{LR}, I_t^{LR}, I_{t+1}^{LR}$) as shown in FIG. 5A, or may include an optical flow estimator 503 to generate the HR optical flow ($F_{t \to t-1}^{HR}, F_{t \to t+1}^{HR}$) from the estimated HR images ($I_{t-1}^{HR}, I_t^{HR}, I_{t+1}^{HR}$) directly as shown in FIG. 5B.

Referring to FIG. 5A, in some embodiments, the optical flow estimator 502 may generate an LR optical flow ($F_{t \to t-1}^{LR}, F_{t \to t+1}^{LR}$) from frame to frame of the LR input frames ($I_{t-1}^{LR}, I_t^{LR}, I_{t+1}^{LR}$) For example, in some embodiments, the optical flow estimator 502 may generate an LR optical flow ($F_{t \to t-1}^{LR}$) from frame (t) to frame (t−1), as well as an LR optical flow ($F_{t \to t+1}^{LR}$) from frame (t) to frame (t+1), of the LR input frames ($I_{t-1}^{LR}, I_t^{LR}, I_{t+1}^{LR}$). The optical flow estimator 502 may generate the LR optical flow ($F_{t \to t-1}^{LR}, F_{t \to t+1}^{LR}$) using any suitable optical flow estimation method or algorithm as would be known to those skilled in the art, for example, such as TV-L1 optical flow estimation, PWCNet or other suitable neural networks, and/or the like. For example, in some embodiments, the optical flow estimator 502 may include a neural network (e.g., a CNN, an RNN, and/or the like) that is trained to estimate the LR optical flow ($F_{t \to t-1}^{LR}, F_{t \to t+1}^{LR}$) from frame to frame of the LR input frames ($I_{t-1}^{LR}, I_t^{LR}, I_{t+1}^{LR}$).

In some embodiments, the optical flow SR generator 504 may upsample the LR optical flow ($F_{t \to t-1}^{LR}, F_{t \to t+1}^{LR}$) to generate (e.g., to estimate) the HR optical flow ($F_{t \to t-1}^{HR}, F_{t \to t+1}^{HR}$) For example, in some embodiments, the optical flow SR generator 504 may upsample the LR optical flow ($F_{t \to t-1}^{LR}, F_{t \to t+1}^{LR}$) using any suitable upsampling method or algorithm, for example, such as bilinear/bicubic interpolation, or may include a deep neural network (e.g., a CNN, an RNN, and/or the like) trained to generate the HR optical flow ($F_{t \to t-1}^{HR}, F_{t \to t+1}^{HR}$) from the LR optical flow ($F_{t \to t-1}^{LR}, F_{t \to t+1}^{LR}$).

Referring to FIG. 5B, in some embodiments, the optical flow estimator 503 may generate the HR optical flow ($F_{t \to t-1}^{HR}, F_{t \to t+1}^{HR}$) from frame to frame of the estimated HR images ($I_{t-1}^{HR}, I_t^{HR}, I_{t+1}^{HR}$) directly. In this case, the optical flow SR generator 504 (e.g., see FIG. 5A) may be omitted. For example, in some embodiments, the optical flow estimator 503 may generate an HR optical flow ($F_{t \to t-1}^{HR}$) from frame (t) to frame (t−1), as well as an HR optical flow ($F_{t \to t+1}^{HR}$) from frame (t) to frame (t+1), directly from the estimated HR images ($I_{t-1}^{HR}, I_t^{HR}, I_{t+1}^{HR}$). The optical flow estimator 503 may generate the HR optical flow ($F_{t \to t-1}^{HR}, F_{t \to t+1}^{HR}$) using any suitable optical flow estimation method or algorithm as would be known to those skilled in the art, for example, such as TV-L1 optical flow estimation, PWCNet or other suitable neural networks, and/or the like. For example, in some embodiments, the optical flow estimator 503 may include a neural network (e.g., a CNN, an RNN, and/or the like) that is trained to estimate the HR optical flow ($F_{t \to t-1}^{HR}, F_{t \to t+1}^{HR}$) from frame to frame of the estimated HR images ($I_{t-1}^{HR}, I_t^{HR}, I_{t+1}^{HR}$) directly.

In some embodiments, the unsupervised learning module 114 may use the HR optical flow ($F_{t \to t-1}^{HR}, F_{t \to t+1}^{HR}$) (e.g., output by the optical flow SR generator 504 or by the optical flow estimator 503) and the estimated HR images ($I_{t-1}^{HR}, I_t^{HR}, I_{t+1}^{HR}$) to compensate for optical motion in the estimated HR images ($I_{t-1}^{HR}, I_t^{HR}, I_{t+1}^{HR}$). For example, as shown in FIGS. 5A and 5B, in some embodiments, the unsupervised learning module 114 may include a 2D warping image transformer 506. In some embodiments, the 2D warping image transformer 506 may warp a 2D image of the estimated HR images ($I_{t-1}^{HR}, I_t^{HR}, I_{t+1}^{HR}$) according to the HR optical flow ($F_{t \to t-1}^{HR}, F_{t \to t+1}^{HR}$), to isolate the optical motion from the estimated HR images ($I_{t-1}^{HR}, I_t^{HR}, I_{t+1}^{HR}$).

In some embodiments, the unsupervised learning module 114 may calculate an unsupervised photometric loss ($L_a$) based on the HR optical flow ($F_{t \to t-1}^{HR}, F_{t \to t+1}^{HR}$) and the estimated HR images ($I_{t-1}^{HR}, I_t^{HR}, I_{t+1}^{HR}$). For example, in some embodiments, the unsupervised learning module 114 may calculate the unsupervised photometric loss ($L_u$) according to an unsupervised loss function shown in equation 10.

$$L_u = \|I_{t-1}^{HR} - W(F_{t \to t-1}^{HR} \circ I_t^{HR})\|^2 + \|I_{t+1}^{HR} - W(F_{t \to t+1}^{HR} \circ I_t^{HR})\|^2 \quad \text{Equation 10:}$$

In equation 10, $L_u$ may correspond to the unsupervised loss, $I_{t-1}^{HR}$ may correspond to an estimated high-resolution image of the first LR input image frame ($I_{t-1}^{LR}$), $I_t^{HR}$ may correspond to an estimated high-resolution image of the second LR input image frame ($I_t^{LR}$), It may correspond to an estimated high-resolution image of the third LR input image frame ($I_{t+1}^{LR}$), $F_{t \to t-1}^{HR}$ may correspond to the optical flow from frame t to frame t−1, $F_{t \to t+1}^{HR}$ may correspond to the optical flow from frame t to frame t+1, ° may correspond to the 2D warping, and W may correspond to a warping operator.

In some embodiments, the weakly supervised learning module 116 may calculate a weakly supervised loss ($L_w$) between weakly labeled HR frames ($\widehat{I_{t-1}^{HR}}, \widehat{I_t^{HR}}, \widehat{I_{t+1}^{HR}}$) and the corresponding estimated HR images ($I_{t-1}^{HR}, I_t^{HR}, I_{t+1}^{HR}$) generated by the supervised learning module 112. For example, in some embodiments, the weak label generator 118 may generate weakly labeled LR frames ($\widehat{I_{t-1}^{LR}}, \widehat{I_t^{LR}}, \widehat{I_{t+1}^{LR}}$) from information derived from the LR input image frames ($I_{t-1}^{LR}, I_t^{LR}, I_{t+1}^{LR}$), for example, such as a semantic segmentation map, and/or the like. In this case, in some embodiments, the weakly supervised learning module 116 may include an upsampler 514 to upsample the weakly labeled LR frames ($\widehat{I_{t-1}^{LR}}, \widehat{I_t^{LR}}, \widehat{I_{t+1}^{LR}}$) to generate the weakly labeled HR frames ($\widehat{I_{t-1}^{HR}}, \widehat{I_t^{HR}}, \widehat{I_{t+1}^{HR}}$) but the present disclosure is not limited thereto. For example, in other embodiments, the weak label generator 118 may generate weakly labeled HR frames ($\widehat{I_{t-1}^{HR}}, \widehat{I_t^{HR}}, \widehat{I_{t+1}^{HR}}$) from the ground-truth HR images ($I_{t-1}^{HR*}, I_t^{HR*}, I_{t+1}^{HR*}$) directly, and in this case, the upsampler 514 may be omitted.

In various embodiments, the weakly labeled HR frames (($\widehat{I_{t-1}^{HR}}, \widehat{I_t^{HR}}, \widehat{I_{t+1}^{HR}}$) may be pixel-based or patch-based. Accordingly, the weakly labeled HR frames ($\widehat{I_{t-1}^{HR}}, \widehat{I_t^{HR}}, \widehat{I_{t+1}^{HR}}$) may include a pixel-pair (i, j) or a patch-pair (p, q), and may define an intensity relationship (e.g., brighter/darker) between the pixels of the pixel-pair (i, j) or the regions of the patch-pair (p, q).

In some embodiments, the weakly supervised learning module 116 may calculate the weakly supervised loss ($L_w$)

for image/video enhancement using the same or substantially the same weakly supervised loss function (e.g., equation 4, equation 5, or equation 6) as that used for monocular depth estimation discussed above with reference to FIG. 3, except that information corresponding to the estimated HR images ($I_{t-1}^{HR}, I_t^{HR}, I_{t+1}^{HR}$) and the weakly labeled HR frames ($\widehat{I_{t-1}^{HR}}, \widehat{I_t^{HR}}, \widehat{I_{t+1}^{HR}}$) may be used as inputs to calculate the weakly supervised loss ($L_w$) between the weakly labeled HR frames ($\widehat{I_{t-1}^{HR}}, \widehat{I_t^{HR}}, \widehat{I_{t+1}^{HR}}$) and the estimated HR images ($I_{t-1}^{HR}, I_t^{HR}, I_{t+1}^{HR}$). For example, as would be appreciated by those having ordinary skill in the art, the weakly supervised loss ($L_w$) may be calculated according to any suitable one of equation 4, equation 5, or equation 6 discussed above by using the intensity relationship (e.g., brighter/darker) corresponding to the estimated HR images ($I_{t-1}^{HR}, I_t^{HR}, I_{t+1}^{HR}$) for each of the pixels (i, j) or regions (p, q) corresponding the weakly labeled HR frames ($\widehat{I_{t-1}^{HR}}, \widehat{I_t^{HR}}, \widehat{I_{t+1}^{HR}}$), rather than using the depth relationship (e.g., closer/farther) corresponding to the estimated depth ($D_t$) for each of the pixels (i, j) or regions (p, q) corresponding to the weakly labeled depth ($\widetilde{D_t}$) as in the monocular depth estimation case discussed above with reference to FIG. 3. Accordingly, redundant description thereof may not be repeated.

In some embodiments, the CV training system 102 may be trained to improve image/video enhancement by optimizing the supervised loss function (e.g., shown in equation 9), the unsupervised loss function (e.g., shown in equation 10), and the weakly supervised loss function (e.g., shown in equation 4, equation 5, or equation 6 with the appropriate substitutions corresponding to the estimated HR images ($I_{t-1}^{HR}, I_t^{HR}, I_{t+1}^{HR}$) and the weakly labeled HR frames ($\widehat{I_{t-1}^{HR}}, \widehat{I_t^{HR}}, \widehat{I_{t+1}^{HR}}$)). For example, in some embodiments, because the estimated HR images ($I_{t-1}^{HR}, I_t^{HR}, I_{t+1}^{HR}$) may be used to calculate each of the supervised loss ($L_s$), the unsupervised loss ($L_u$), and the weakly supervised loss ($L_w$), the joint optimizer 120 may jointly optimize the supervised loss function, the unsupervised loss function, and the weakly supervised loss function according to the joint loss function ($L_{all}$), for example, as shown in equation 1.

Figure 6:
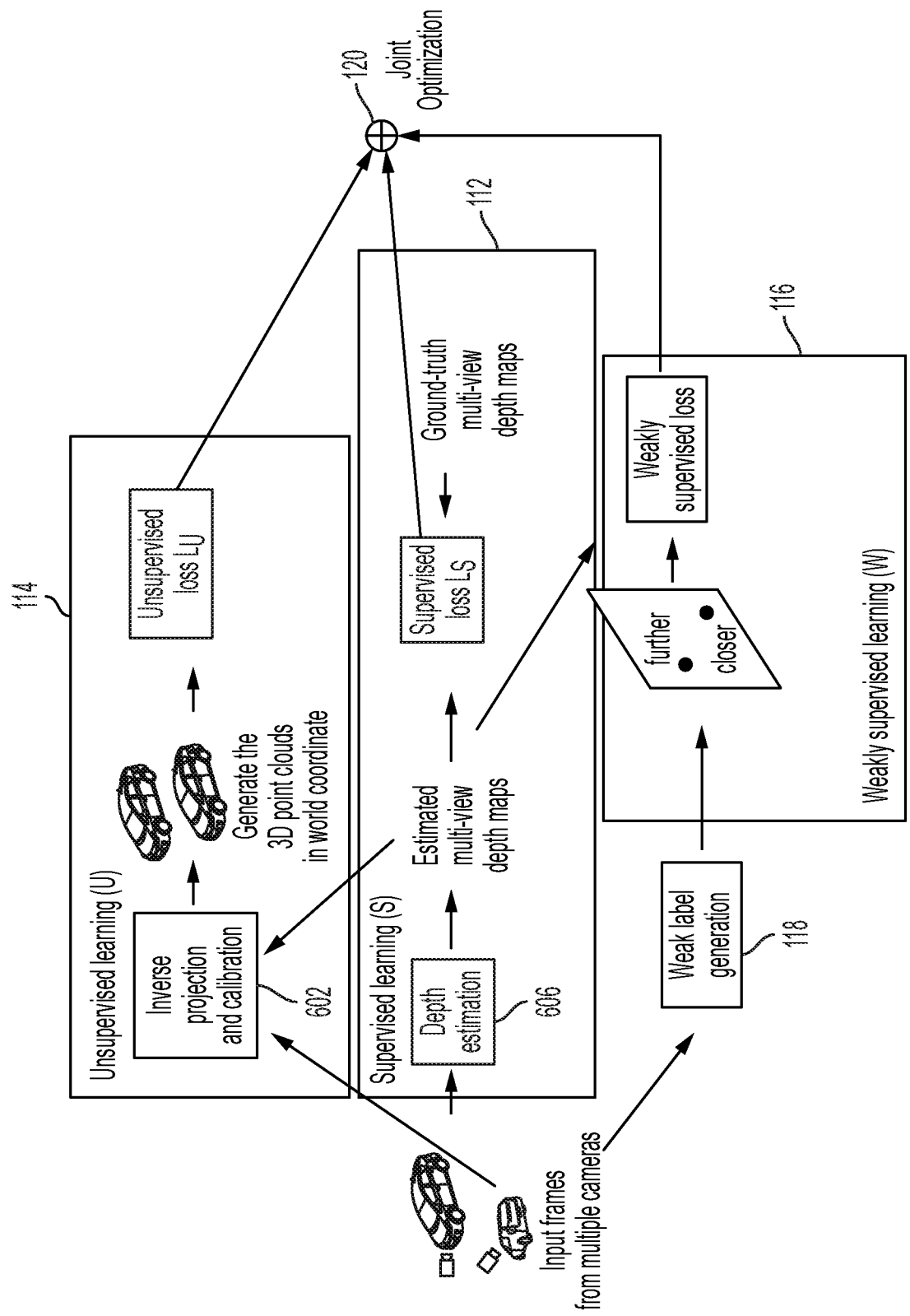
FIG. 6 is an illustration of the multiple learning strategy framework of the computer vision training system for multi-view depth estimation, according to one or more example embodiments of the present disclosure.

FIG. 6 is an illustration of the multiple learning strategy framework of the computer vision training system for multi-view depth estimation, according to one or more example embodiments of the present disclosure.

In one or more example embodiments of the present disclosure, the multiple learning strategy framework of the CV training system 102 may be applied to multi-view depth estimation. Generally, multi-view depth estimation is a CV application that may be used to align pixelwise depth maps of different input images with different views (e.g., different field-of-views) from each other. Similar to stereo matching, the input images for multi-view depth estimation may be generated from different sources (e.g., different cameras), but unlike in stereo matching where the different sources may be well aligned with each other, the sources (e.g., the cameras) that generate the multiple views for multi-view depth estimation may not be well aligned with each other. For a non-limiting example, one view may be a front view of an object or a scene, and another view may be a side view of the object or the scene.

In brief overview, given multiple input images including different views (e.g., different field-of-views) from each other, the supervised learning module may estimate a depth of an object shown in each of the input images as the supervision output, and may calculate a supervised loss between the estimated depth for each of the input images and a ground-truth corresponding to the estimated depth for each of the input images. The unsupervised learning module 114 may generate a 3D point cloud for each of the input images according to the estimated depth for each of the input images, and may calculate an unsupervised photometric loss based on distances between 3D coordinates of aligned feature points in the 3D point clouds of the input images. The weakly supervised learning module 114 may calculate a weakly supervised loss between the estimated depth for each of the input images and a weakly labeled depth for each of the input images, which may be generated from the input images or from the ground-truth. In some embodiments, the CV training system 102 may be trained by optimizing the supervised loss, the unsupervised photometric loss, and the weakly supervised loss concurrently.

In more detail, referring to FIG. 6, in some embodiments, the CV training system 102 may receive multiple input images ($I_a, I_b$) corresponding to different views (e.g., different field-of-views) of the same scene. For example, the multiple input images ($I_a, I_b$) may include a first image ($I_a$) and a second image ($I_b$), which may be generated by different sources (e.g., different cameras) having different field-of-views from each other, for example, such as a front camera and a side camera. While FIG. 6 shows two images ($I_a$) and ($I_b$) as the input images ($I_a, I_b$) as a simplified example, the present disclosure is not limited thereto, and the input images may include more than two input images ($I_a, I_b$).

In some embodiments, the supervised learning module 112 may estimate a depth ($D_a, D_b$) of an object in each of the input images ($I_a, I_b$) as the supervision output. For example, in some embodiments, the supervised learning module 112 may include a depth estimator (e.g., a depth estimation network) 606 to estimate the depth ($D_a, D_b$) in each of the input images ($I_a, I_b$) using any suitable depth estimation method or algorithm as would be known to those skilled in the art, for example, such as conditional random field, encoder-decoder network, and/or the like. For example, in some embodiments, the depth estimator 606 may include one or more encoder-decoder pairs (e.g., a network of encoder-decoder pairs) to estimate the depth ($D_a, D_b$) of the object in each of the input images ($I_a, I_b$).

In some embodiments, the supervised learning module 112 may calculate a supervised loss ($L_s$) between the estimated depth ($D_a, D_b$) of each of the input images ($I_a, I_b$) and a ground-truth of the depth ($D^*_a, D^*_b$) for each of the input images ($I_a, I_b$). For example, in some embodiments, the supervised learning module 112 may calculate the supervised loss ($L_s$) according to a supervised loss function shown in equation 11.

$$L_s = |D_v - D^*_v| \qquad \text{Equation 11:}$$

In equation 11, $L_s$ may correspond to the supervised loss, $D_v$ may correspond to a corresponding one of the estimated depth ($D_a, D_b$) output by the depth estimator 606, and $D^*_v$ may correspond to the ground-truth ($D^*_a, D^*_b$) corresponding to the corresponding one of the estimated depth ($D_a, D_b$).

In some embodiments, the unsupervised learning module 114 may include an inverse projection and calibration image transformer 602 to inverse project each of the input images ($I_a, I_b$) to a 3D space (e.g., camera coordinates) according to the estimated depth ($D_a, D_b$) of the input images ($I_a, I_b$), and further to world coordinates by an extrinsic matrix. In some embodiments, the inverse projection and calibration image transformer 602 may generate a 3D point cloud in the world coordinates for each of the input images ($I_a, I_b$), and may calibrate (e.g., may align) common feature points in each of the 3D point clouds that correspond to each other. In other words, in some embodiments, the inverse projection and calibration image transformer 602 may identify common regions in the input images ($I_a, I_b$) according to the 3D world coordinates based on the estimated depth ($D_a, D_b$), and may calibrate (e.g., may align) the 3D world coordinates of the input images ($I_a, I_b$) to each other according to the identified common regions.

In some embodiments, the unsupervised learning module 114 may calculate an unsupervised photometric loss ($L_u$) based on distances between the 3D coordinates of the aligned feature points in the 3D point clouds of each of the input images ($I_a, I_b$). For example, in some embodiments, the unsupervised learning module 114 may calculate the unsupervised photometric loss ($L_u$) according to an unsupervised loss function shown in equation 12.

$$L_u = \sum_x \|I_a(x) - I_b(x)\|^2 \qquad \text{Equation 12}$$

In equation 12, $L_u$ may correspond to the unsupervised loss, x may correspond to a pixel that appears in the common regions of the two cameras, $I_a(x)$ may correspond to the 3D world coordinates of the pixel x aligned by the first camera, $I_b(x)$ may correspond to the 3D world coordinates of the pixel x aligned by the first camera, and $\|\cdot\|^2$ may correspond to the Euclidean distance between two coordinates.

In some embodiments, the weakly supervised learning module 116 may calculate a weakly supervised loss ($L_w$) between a weakly labeled depth ($\widetilde{D_a}, \widetilde{D_b}$) corresponding to each of the input images ($I_a, I_b$) and the estimated depth ($D_a, D_b$) generated by the supervised learning module 112 for each of the input images ($I_a, I_b$). For example, in some embodiments, the weak label generator 118 may generate the weakly labeled depth ($\widetilde{D_a}, \widetilde{D_b}$) for each of the input images ($I_a, I_b$), and the weakly supervised learning module 116 may calculate the weakly supervised loss ($L_w$) between the weakly labeled depth ($\widetilde{D_a}, \widetilde{D_b}$) and the estimated depth ($D_a, D_b$) in the same or substantially the same manner as those described above in the monocular depth estimation case with reference to FIG. 3, and thus, redundant description thereof may not be repeated.

In some embodiments, the CV training system 102 may be trained to improve multi-view depth estimation by optimizing the supervised loss function (e.g., shown in equation 11), the unsupervised loss function (e.g., shown in equation 12), and the weakly supervised loss function (e.g., shown in equation 4, equation 5, or equation 6) concurrently. For example, in some embodiments, because the estimated depth ($D_a, D_b$) may be used to calculate each of the supervised loss ($L_s$), the unsupervised loss ($L_u$), and the weakly supervised loss ($L_w$), the joint optimizer 120 may jointly optimize the supervised loss function, the unsupervised loss function, and the weakly supervised loss function according to the joint loss function ($L_{all}$), for example, as shown in equation 1.

The following table 1 illustrates the effectiveness of various different multiple learning strategy frameworks of the CV training system 102, according to one or more example embodiments of the present disclosure. As a non-limiting example, table 2 illustrates the various different learning strategy frameworks of the CV training system 102 as applied to the monocular depth estimation CV application described above with reference to FIG. 3 using the KITTI street view dataset as a training dataset.

TABLE 1

| ML Framework | RMSE (in meter, lower is better) | REL (in %, lower is better) |
| --- | --- | --- |
| S | 3.454 | 6.64 |
| S + U | 2.362 | 5.32 |
| S + W | 3.147 | 5.78 |
| S + U + W | 2.191 | 4.62 |

In table 1, RMSE may correspond to root mean square error, REL may correspond to relative error, S may represent the supervised learning framework only, S+U may represent the supervised learning framework plus the unsupervised learning framework, S+W may represent the supervised learning framework plus the weakly supervised learning framework, and S+U+W may represent the supervised learning framework plus the unsupervised learning framework plus the weakly supervised learning framework.

As shown in table 1, each of the supervised learning framework plus the unsupervised learning framework S+U and the supervised learning framework plus the weakly supervised learning framework S+W performs better than the supervised learning framework only S. Further, the supervised learning framework plus the unsupervised learning framework plus the weakly supervised learning framework S+U+W may perform better than each of the supervised learning framework plus the unsupervised learning framework S+U and the supervised learning framework plus the weakly supervised learning framework S+W. Accordingly, a more accurate deep learning neural network may be provided by combining at least two of these frameworks, as described according to one or more example embodiments of the present disclosure above.

Figure 8:
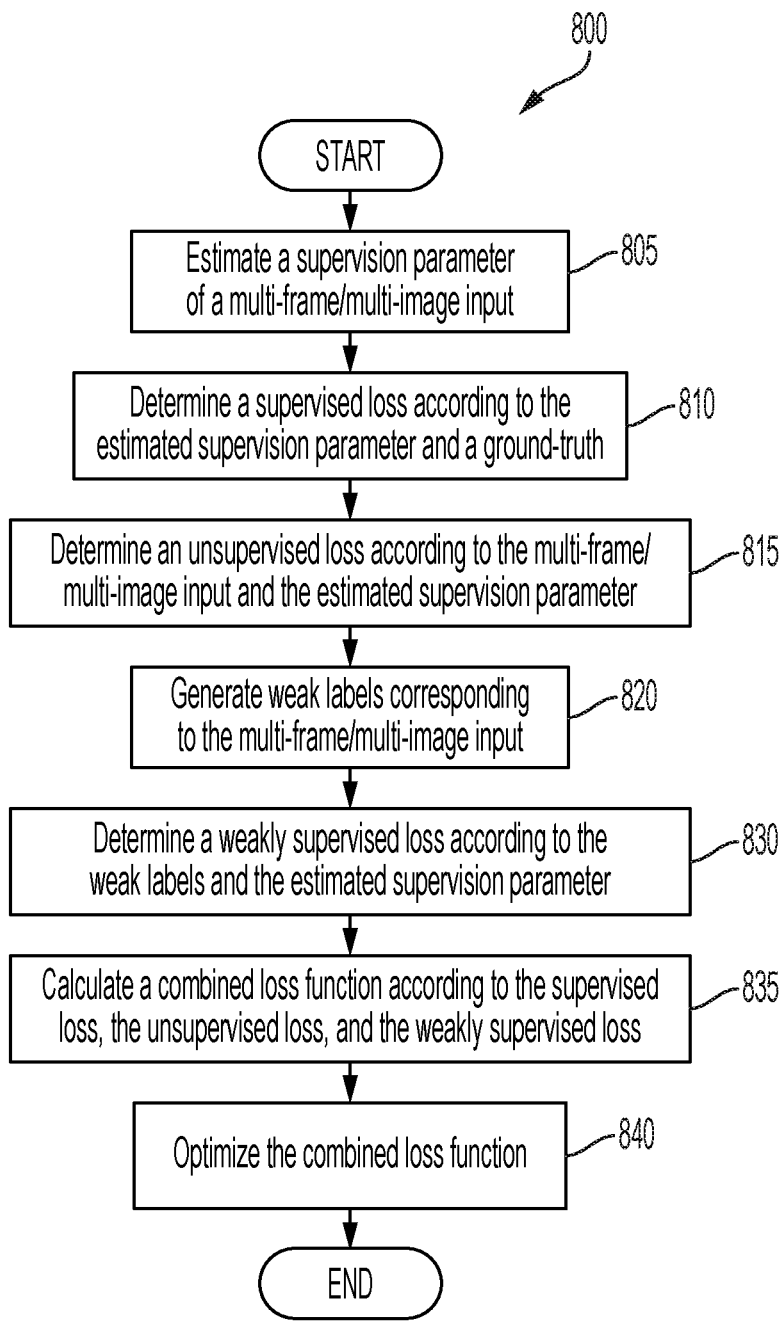
FIG. 8 is a flow diagram of a method of training the computer vision training system, according to one or more example embodiments of the present disclosure.

FIGS. 7A and 7B is a table illustrating an overview of the multiple learning strategy framework of the computer vision training system as applied to various different computer vision applications described above, according to one or more example embodiments of the present disclosure. FIG. 8 is a flow diagram of a method of training the computer vision training system, according to one or more example embodiments of the present disclosure. The present disclosure is not limited to the sequence or number of the operations of the method 800 shown in FIG. 8, and can be altered into any desired sequence or number of operations as recognized by a person having ordinary skill in the art. For example, in some embodiments, the order may vary, or the method may include fewer or additional operations. Further, the operations shown in the method 800 may be performed by any suitable one of the components or any suitable combination of the components of those of one or more example embodiments described above.

Referring to FIGS. 7 and 8, a multi-frame/multi-image input may be received by the CV training system 102 and the method 800 may start. For example, depending on a target CV application, the multi-frame/multi-image input may be generated by a single source (e.g., a single camera), or by multiple sources (e.g., a dual-camera or different cameras). A supervision output of the multi-frame/multi-image input may be estimated at block 805. In some embodiments, the supervised learning module 112 may estimate the supervision output according to the target CV application. For example, the supervision output (e.g., the estimated supervision item) may correspond to the depth ($D_t$) if the target CV application corresponds to monocular depth estimation, the disparity (D) if the target CV application corresponds to stereo matching, the HR images ($I_{t-1}^{HR}, I_t^{HR}, I_{t+1}^{HR}$) if the target CV application corresponds to image/video enhancement, and/or the multi-view depth ($D_a,D_b$) if the target CV application corresponds to multi-view depth estimation.

In some embodiments, a supervised loss may be determined according to the estimated supervision output and a ground-truth at block 810. For example, in some embodiments, the supervised learning module 112 may determine (e.g., may generate, may calculate, may minimize, and/or the like) the supervised loss ($L_s$) function according to the estimated supervision output and a ground-truth corresponding to the supervision output. In this case, for example, the supervised loss ($L_s$) may correspond between the depth ($D_t$) and a ground-truth depth (Di) if the target CV application corresponds to monocular depth estimation, the disparity (D) and a ground-truth disparity (D*) if the target CV application corresponds to stereo matching, the HR images ($I_{t-1}^{HR}, I_t^{HR}, I_{t+1}^{HR}$) and ground-truth HR images ($I_{t-1}^{HR*}, I_t^{HR*}, I_{t+1}^{HR*}$) if the target CV application corresponds to image/video enhancement, and/or the multi-view depth ($D_a, D_b$) and ground-truth multi-view depth ($D_a^*, D_b^*$) if the target CV application corresponds to multi-view depth estimation.

In some embodiments, an unsupervised loss may be determined according to the multi-frame/multi-image input and the estimated supervision output at block 815. For example, in some embodiments, the unsupervised learning module 114 may use the supervision output to transform or warp an image corresponding to one or more of the multi-frame/multi-image input. For example, the transformed or warped image may correspond to the rigid-motion compensation and the 2D to 3D coordinate projection based on the estimated depth ($D_t$) if the target CV application corresponds to monocular depth estimation, the generated warped image (I') based on the estimated disparity (D) if the target CV application corresponds to stereo matching, the optical flow estimation and the 2D HR image warping based on the estimated HR images ($I_{t-1}^{HR}, I_t^{HR}, I_{t+1}^{HR}$) if the target CV application corresponds to image/video enhancement, and/or the perspective projection and calibration of aligned points in the 3D point clouds based on the estimated multi-view depth ($D_a, D_b$) if the target CV application corresponds to multi-view depth estimation.

In some embodiments, the unsupervised learning module 114 may use the transformed or warped image to determine (e.g., to generate, to calculate, to minimize, and/or the like) the unsupervised loss ($L_s$) function. For example, in some embodiments, the unsupervised loss ($L_u$) function may correspond to a photometric loss between the rigid-motion compensation and the 2D to 3D coordinate projection based on the estimated depth ($D_t$) and a corresponding original (or true image) of the multi-frame/multi-image input if the target CV application corresponds to monocular depth estimation, a photometric loss between the generated warped image (I') based on the estimated disparity (D) and an original (or true image) of the warped image if the target CV application corresponds to stereo matching, a photometric loss between the optical flow estimation and the 2D HR image warping based on the estimated HR images ($I_{t-1}^{HR}, I_t^{HR}, I_{t+1}^{HR}$) and the estimated HR optical flow if the target CV application corresponds to image/video enhancement, and/or distances between the aligned points in the 3D point clouds based on the estimated multi-view depth ($D_a, D_b$) if the target CV application corresponds to multi-view depth estimation.

In some embodiments, weak labels (e.g., weakly supervised labels) may be generated corresponding to the multi-frame/multi-image input at block 820. For example, in some embodiments, the weak label generator 118 may generate the weak labels from the multi-frame/multi-image input or from a corresponding ground-truth. The weak labels generated by the weak-label generator 118 may be pixel-based or patch-based, and may define a suitable relationship (e.g., a depth relationship, a disparity relationship, an intensity relationship, and/or the like) between pixel-pairs or patch-pairs of the weak labels for a target CV application.

In some embodiments, a weakly supervised loss may be determined according to the weak labels and the estimated supervision output at block 825. For example, in some embodiments, the weakly supervised learning module 116 may determine (e.g., may generate, may calculate, may minimize, and/or the like) the weakly supervised loss ($L_w$) function to compare the weak labels with the estimated supervision output. In this case, the weakly supervised loss ($L_w$) function may be used to evaluate a consistency between a weakly labeled depth ($\hat{D}_t$) and the estimated depth ($D_t$) if the target CV application corresponds to monocular depth estimation, a weakly labeled disparity ($\hat{D}$) and the estimated disparity (D) if the target CV application corresponds to stereo matching, weakly labeled HR frames ($\hat{I}_{t-1}^{HR}, \hat{I}_t^{HR}, \hat{I}_{t+1}^{HR}$) and estimated HR images ($I_{t-1}^{HR}, I_t^{HR}, I_{t+1}^{HR}$) if the target CV application corresponds to image/video enhancement, and/or weakly labeled depth ($\hat{D}_a, \hat{D}_b$) and the estimated depth ($D_a, D_b$) if the target CV application corresponds to multi-view depth estimation.

In some embodiments, a combined loss function may be calculated according to the supervised loss, the unsupervised loss, and the weakly supervised loss at block 830. For example, in some embodiments, the joint optimizer 120 may generate (e.g., may determine, may calculate, may minimize, and/or the like) a joint loss function ($L_{all}$) according to the supervised loss ($L_S$) function, the unsupervised loss ($L_U$) function, and the weakly supervised loss ($L_w$) function, for example, as shown in equation 1. In some embodiments, the joint optimizer 120 may apply suitable weights ($w_s, w_u, w_w$) to balance each of the supervised loss ($L_S$) function, the unsupervised loss ($L_U$) function, and the weakly supervised loss ($L_w$) function in the joint loss function ($L_{all}$). For example, in some embodiments, the weights ($w_s, w_u, w_w$) may be determined (e.g., may be set) according to an ablation study for a corresponding CV application.

In some embodiments, the combined loss function may be optimized at block 835 and the method 800 may end. For example, in some embodiments, the CV training system 102 may be trained end-to-end for a corresponding CV application by optimizing (e.g., minimizing) the joint loss function ($L_{all}$) corresponding to the supervised loss ($L_S$) function, the unsupervised loss ($L_U$) function, and the weakly supervised loss ($L_w$) function. According to one or more example embodiments of the present disclosure, because the estimated supervision output may be used to calculate each of the supervised loss ($L_s$), the unsupervised loss ($L_u$), and the weakly supervised loss ($L_w$), the joint optimizer 120 may use the joint loss function ($L_{all}$), for example, as shown in equation 1, to optimize the supervised loss ($L_S$) function, the unsupervised loss ($L_U$) function, and the weakly supervised loss ($L_w$) function concurrently. Accordingly, performance of the CV training system 102 may be improved.

In the drawings, the relative sizes of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Although some example embodiments have been described, those skilled in the art will readily appreciate that various modifications are possible in the example embodiments without departing from the spirit and scope of the present disclosure. It will be understood that descriptions of features or aspects within each embodiment should typically be considered as available for other similar features or aspects in other embodiments, unless otherwise described. Therefore, it is to be understood that the foregoing is illustrative of various example embodiments and is not to be construed as limited to the specific example embodiments disclosed herein, and that various modifications to the disclosed example embodiments, as well as other example embodiments, are intended to be included within the spirit and scope of the present disclosure as defined in the appended claims, and their equivalents.

What is claimed is:

1. A computer vision (CV) training system, comprising:
   a supervised learning system configured to estimate a supervision output from one or more input images according to a target CV application, and determine a supervised loss according to the supervision output and a ground-truth of the supervision output;
   an unsupervised learning system configured to determine an unsupervised loss according to the supervision output and the one or more input images;
   a weakly supervised learning system configured to determine a weakly supervised loss according to the supervision output and a weak label corresponding to the one or more input images; and
   a joint optimizer configured to optimize the supervised loss, the unsupervised loss, and the weakly supervised loss.

2. The system of claim 1, wherein the target CV application corresponds to monocular depth estimation, and the supervision output corresponds to a depth estimated from a target image from among the one or more input images.

3. The system of claim 2, wherein the unsupervised learning system is configured to convert 2-dimensional (2D) image coordinates corresponding to the one or more input images into 3-dimensional (3D) coordinates according to the estimated depth, and calculate the unsupervised loss based on at least the 3D coordinates.

4. The system of claim 1, wherein the target CV application corresponds to stereo matching, and the supervision output corresponds to a disparity estimated between a left image and a right image from among the one or more input images.

5. The system of claim 4, wherein the unsupervised learning system is configured to shift one of the left image and the right image according to the estimated disparity to generate a warped image, and calculate the unsupervised loss based on at least the warped image.

6. The system of claim 1, wherein the target CV application corresponds to image/video enhancement, and the supervision output corresponds to high-resolution images estimated from low-resolution input images from among the one or more input images.

7. The system of claim 6, wherein the unsupervised learning system is configured to estimate an optical flow corresponding to the estimated high-resolution images, and calculate the unsupervised loss based on at least the estimated optical flow and the estimated high-resolution images.

8. The system of claim 1, wherein the target CV application corresponds to multi-view depth estimation, and the supervision output corresponds to a depth estimated in each of multiple input frames from among the one or more input images.

9. The system of claim 1, wherein the joint optimizer is configured to concurrently optimize the supervised loss, the unsupervised loss, and the weakly supervised loss according to a joint loss function including corresponding weights for the supervised loss, the unsupervised loss, and the weakly supervised loss.

10. The system of claim 1, further comprising a weak label generator to generate the weak label as a patch-based weak label having a patch-pair corresponding to different cropped regions of the one or more input images, the patch-based weak label defining a relationship corresponding to the supervision output between the cropped regions of the patch-pair.

11. A method for training a computer vision (CV) system, the method comprising:
estimating a supervision output from one or more input images according to a target CV application;
determining a supervised loss according to the supervision output and a ground-truth of the supervision output;
determining an unsupervised loss according to the supervision output and the one or more input images;
determining a weakly supervised loss according to the supervision output and a weak label corresponding to the one or more input images; and
optimizing the supervised loss, the unsupervised loss, and the weakly supervised loss.

12. The method of claim 11, wherein the target CV application corresponds to monocular depth estimation, and the supervision output corresponds to a depth estimated from a target image from among the one or more input images.

13. The method of claim 12, further comprising:
converting 2-dimensional (2D) image coordinates corresponding to the one or more input images into 3-dimensional (3D) coordinates according to the estimated depth; and
calculating the unsupervised loss based on at least the 3D coordinates.

14. The method of claim 11, wherein the target CV application corresponds to stereo matching, and the supervision output corresponds to a disparity estimated between a left image and a right image from among the one or more input images.

15. The method of claim 14, further comprising:
shifting one of the left image and the right image according to the estimated disparity to generate a warped image; and
calculating the unsupervised loss based on at least the warped image.

16. The method of claim 11, wherein the target CV application corresponds to image/video enhancement, and the supervision output corresponds to high-resolution images estimated from low-resolution images from among the one or more input images.

17. The method of claim 16, further comprising:
estimating an optical flow corresponding to the estimated high-resolution images; and
calculating the unsupervised loss based on at least the estimated optical flow and the estimated high-resolution images.

18. The method of claim 11, wherein the target CV application corresponds to multi-view depth estimation, and the supervision output corresponds to a depth estimated in each of multiple input frames from among the one or more input images.

19. The method of claim 11, wherein the optimizing comprises:
concurrently optimizing the supervised loss, the unsupervised loss, and the weakly supervised loss according to a joint loss function including corresponding weights for the supervised loss, the unsupervised loss, and the weakly supervised loss.

20. The method of claim 11, further comprising:
generating the weak label as a patch-based weak label having a patch-pair corresponding to different cropped regions of the one or more input images, the patch-based weak label defining a relationship corresponding to the supervision output between the cropped regions of the patch-pair.

* * * * *